United States Patent [19]

Grob et al.

[11] Patent Number: 4,646,697
[45] Date of Patent: Mar. 3, 1987

[54] METHOD AND APPARATUS FOR CONTROLLING THE OPERATING CHARACTERISTIC QUANTITIES OF AN INTERNAL COMBUSTION ENGINE

[75] Inventors: Ferdinand Grob, Besigheim; Peter-Jürgen Schmidt, Schwieberdingen; Josef Wahl, Stuttgart, all of Fed. Rep. of Germany

[73] Assignee: Robert Bosch GmbH, Stuttgart, Fed. Rep. of Germany

[21] Appl. No.: 696,645

[22] Filed: Jan. 30, 1985

[30] Foreign Application Priority Data

Feb. 1, 1984 [DE] Fed. Rep. of Germany ....... 3403393
Mar. 7, 1984 [DE] Fed. Rep. of Germany ....... 3408223

[51] Int. Cl.[4] .......................... F02P 5/04; F02B 3/00
[52] U.S. Cl. .................................. 123/436; 123/426; 123/425; 123/440
[58] Field of Search ............... 123/425, 435, 440, 486, 123/436, 426, 489

[56] References Cited

U.S. PATENT DOCUMENTS

| | | | |
|---|---|---|---|
| 4,235,204 | 11/1980 | Rice | 123/440 |
| 4,351,281 | 9/1982 | Geiger | 123/425 |
| 4,432,322 | 2/1984 | Inoue | 123/486 |
| 4,467,764 | 8/1984 | Takasu | 123/486 |
| 4,495,920 | 1/1985 | Matsumura | 123/436 |
| 4,502,442 | 3/1985 | Takakuwa | 123/436 |
| 4,575,800 | 3/1986 | Kittelson | 123/436 |

Primary Examiner—Ronald B. Cox
Attorney, Agent, or Firm—Walter Ottesen

[57] ABSTRACT

The invention is directed to an apparatus for controlling the operating characteristic quantities of an internal combustion engine. The apparatus includes a characteristic field for pre-controlling engine variables influencing the operating characteristic quantities. The characteristic field is made up of the operating characteristic quantities. The apparatus further includes a control arrangement for controlling to maximum power output of the engine. The control arrangement is superposed on the pre-control and includes means for determining corrective values from the control loop in a predetermined operating range of the engine. The corrective values are applied to influence all of the pre-control values of the characteristic field over all operating ranges. With the apparatus of the invention, it is possible in a simple manner to consider changes in the surrounding factors that influence the engine. Two embodiments are described wherein the control is achieved by means of an optimizer and the engine is controlled to maximum power in either the part-load range or the full-load range of the engine. The apparatus of the invention can be used, for example, in air-fuel mixture metering, charging air control, control of exhaust gas return or also idle control.

17 Claims, 20 Drawing Figures

FIG. 1
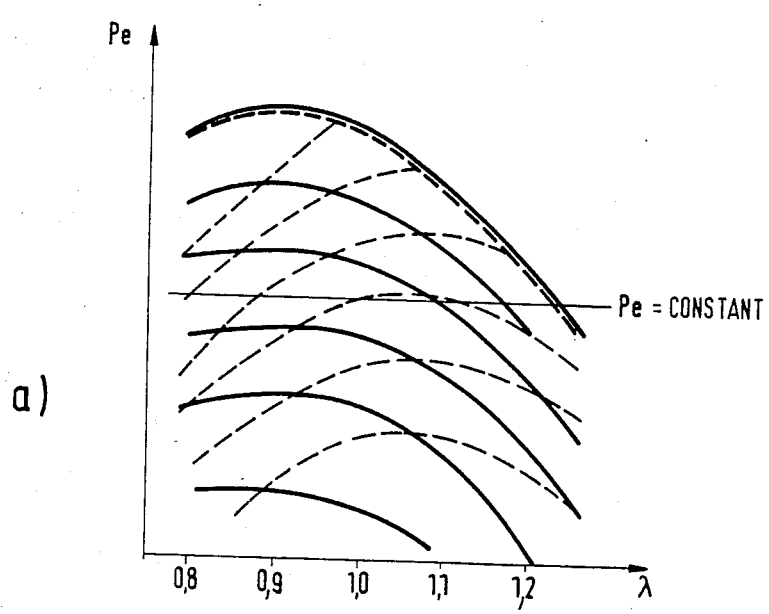
a)
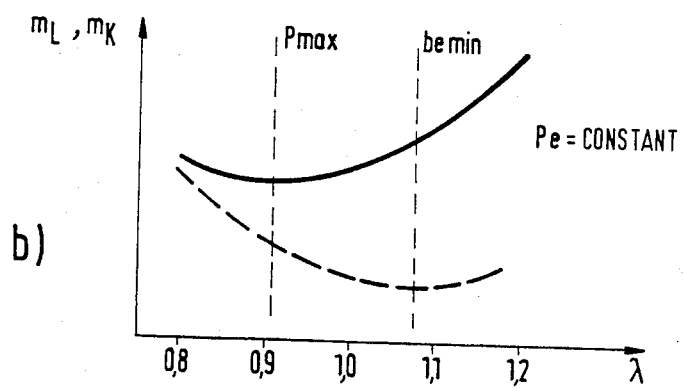
b)

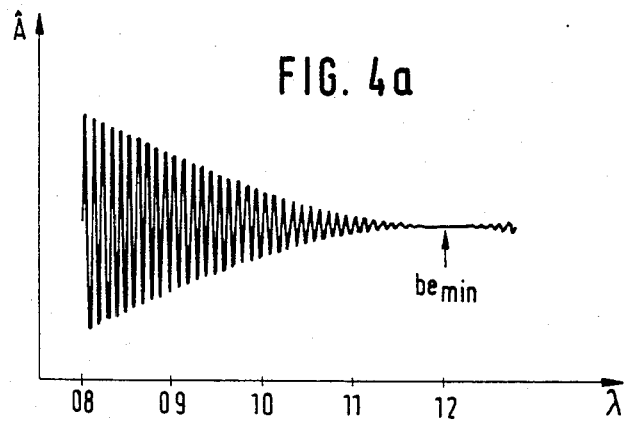
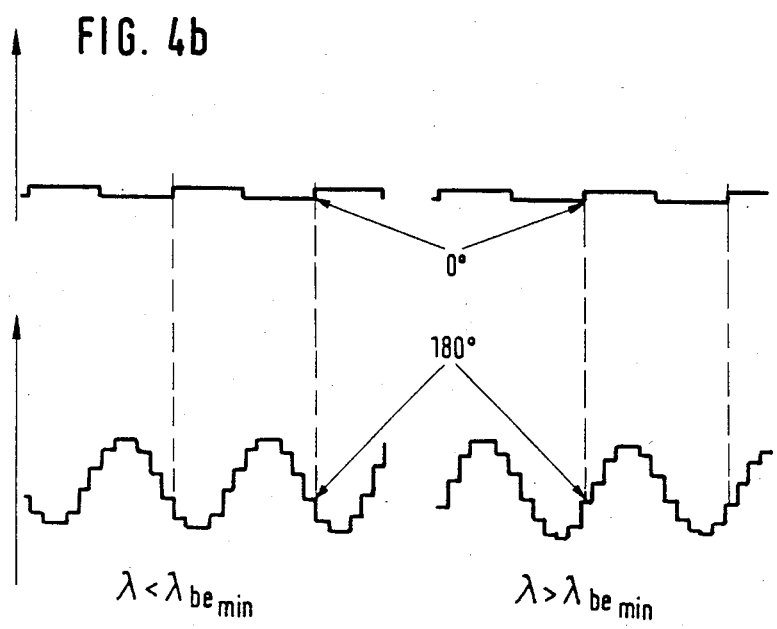

FIG. 6
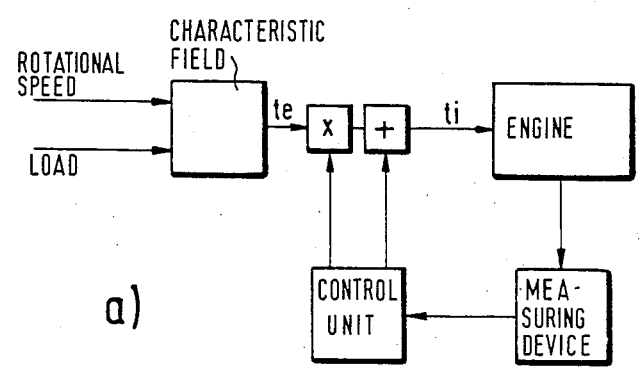
a)
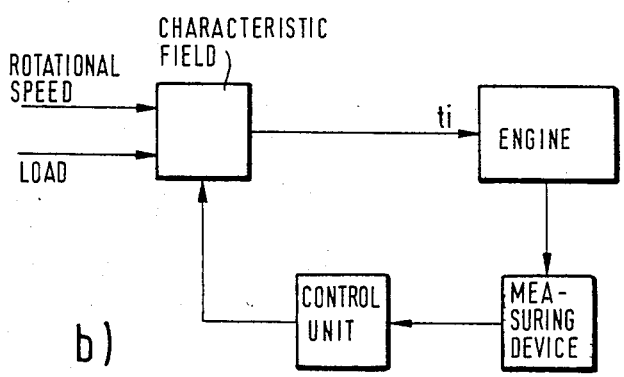
b)

FIG. 7
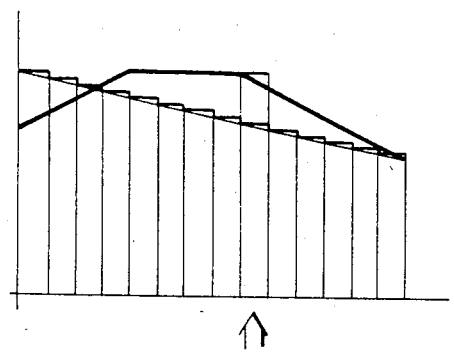
a)
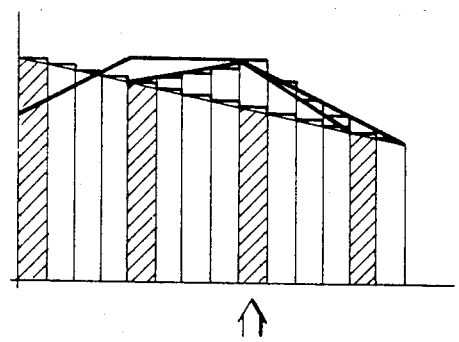
b)
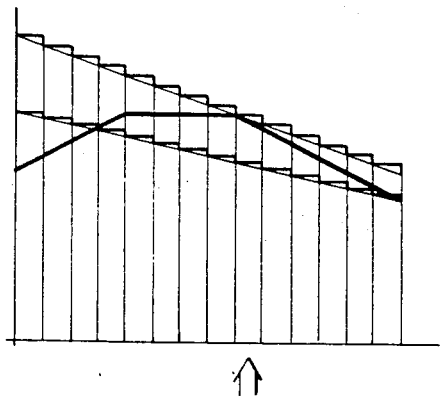
c)

METHOD AND APPARATUS FOR CONTROLLING THE OPERATING CHARACTERISTIC QUANTITIES OF AN INTERNAL COMBUSTION ENGINE

FIELD OF THE INVENTION

The invention relates to a method and apparatus for controlling the operating characteristic quantities of an internal combustion engine. The apparatus includes a characteristic field made up of stored values in the form of operating characteristic quantities. The characteristic field pre-controls engine variables influencing the operating characteristic quantities. The apparatus also includes a control arrangement for controlling to the maximum power output of the engine and this control arrangement is superposed on the pre-control.

BACKGROUND OF THE INVENTION

An apparatus for controlling operating characteristic quantities of an internal combustion engine is known from German published patent application DE-OS No. 2,847,021 and British patent application No. 2,034,930 which is a Convention application based on the German application. These applications disclose an arrangement for controlling operating characteristic quantities of an internal combustion engine to optimal values, especially operating characteristic quantities such as power or the specific fuel consumption. This arrangement includes a control arrangement which pre-controls the engine variables and which varies the engine variables at selectable times or at the occurrence of definite operating conditions. The pre-control values are influenced by a control of the internal combustion engine to optimum power or to minimal specific fuel consumption. An extreme-value control is also known as an optimizer and is suggested for a control method to change the pre-control values.

Although this control arrangement has performed well, improvements can be made thereto with respect to various facets thereof. Especially the influence of various factors from outside such as air temperature or elevation which act on all characteristic field values of the pre-control characteristic field in the same manner for systems wherein air mass is not measured are not optimally considered by the above-mentioned known arrangement.

SUMMARY OF THE INVENTION

The apparatus according to the invention for controlling the operating control characteristics of an internal combustion engine permits an effective and rapid consideration of surrounding factors influencing the characteristic field values of the pre-control characteristic field. An optimal adaptation of the pre-control characteristic field to the surrounding conditions of the internal combustion engine is provided in a simple manner because the influence of the above-mentioned surrounding factors is determined in a predetermined operating range of the internal combustion engine and are, however, considered in all operating ranges of the internal combustion engine.

An especially fast and precise control procedure is provided especially because the control superposed on the pre-control is configured as an optimizer directed to maximum power.

An especially advantageous embodiment of the invention is given by the fact that the correction factor determined via the control can be defined in the part-load range. In this manner, it is possible to carry out the correction often, since the internal combustion engine is often operated in the part-load range.

Furthermore, it has been shown to be most advantageous that during the time period that the control to maximum power becomes effective, measures can be taken which prevent an increased power output unwanted by the driver of the vehicle equipped with this internal combustion engine. Depending upon the fuel metering system, it can be desirable to vary either the point of ignition or the fuel metered to individual cylinders of the internal combustion engine.

Further advantages and improvements of the invention will become apparent from the subsequent description of the embodiments of the invention, the drawing and the claims.

BRIEF DESCRIPTION OF THE DRAWING

The invention will now be described with reference to the drawing wherein:

FIG. 1a is a graph showing the mean effective pressure $P_e$ of an internal combustion engine plotted against air ratio $\lambda$, with fuel and air quantities as parameters;

FIG. 1b is a graph showing the relationship between air quantity and fuel quantity along the vertical axis and air ratio $\lambda$ along the horizontal axis for a predetermined constant mean pressure $P_e$;

FIGS. 4a to 4c graphically show the amplitude and the phase relationship of a band-pass in an optimizer system;

FIG. 6a is a block diagram of a control system superposed on the pre-control system and operating thereon multiplicatively or additively;

FIG. 6b is a block diagram of a control system superposed on the pre-control system for individual characteristic field adaptation;

FIG. 7a is a graph showing the adaptation of individual characteristic field values;

FIG. 7b is a graph showing the adaptation of regions of the characteristic field;

FIG. 7c is a graph showing the multiplicative adaptation of the entire characteristic field;

DESCRIPTION OF THE PREFERRED EMBODIMENTS OF THE INVENTION

Figure 2:
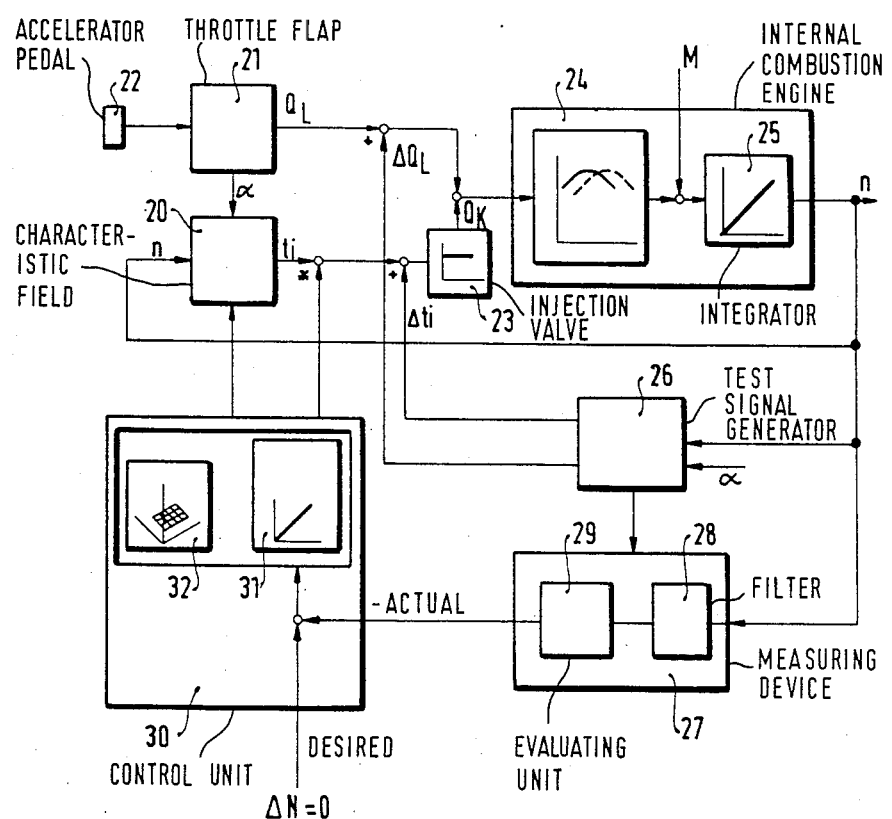
FIG. 2 is a block diagram of a first embodiment incorporating optimizer.

The design of apparatus for metering an air-fuel mixture to internal combustion engines is generally based on the following requirements:

achieve a minimum specific fuel consumption;
keep exhaust gas emissions low; and,
ensure a satisfactory road behavior.

To this end, various control methods some of which will be described in the following are generally utilized, permitting the use of simple and low-cost sensing devices and actuators and ensuring freedom from maintenance and an increase in long-term stability. Also, spreads between individual units can be ignored so that an exchangeability of, for example, sensing devices is ensured and adaptation of the apparatus to different types of engines is facilitated. Further, the use of control systems results in functional improvements such as an optimization of the engine operating behavior during starting, warm-up and idling periods and in the full-load range. The same applies to non-stationary phases of the internal combustion engine, for example, during accelerating or overrunning operation thereof.

In contrast to a regulated (closed-loop) system in which possibly occurring disturbances are detected, while, however, the internal combustion engine is adapted to the new conditions quite slowly as a result of nonuniform combustion, gas transit times, et cetera, control (open-loop) systems permit a very rapid adaptation to changed input conditions. On the other hand, disturbances can be taken into account only incompletely or, if taken into account, only with substantial effort. By using a self-adaptive characteristic field supplying pre-control values which are influenced by a superposed regulation, it is intended to utilize the respective advantages of open-loop controlled and closed-loop controlled systems.

For a brief explanation of the control methods, FIG. 1 shows characteristic curves of a spark-ignition engine. In FIG. 1a, the mean effective pressure $P_e$ which is proportional to the power is plotted against the air ratio $\lambda$, with the quantity of fuel (broken lines) and the quantity of air (solid lines) shown as parameters. From these characteristics it will be seen that a predetermined mean effective pressure or a predetermined power (in this embodiment, a mean effective pressure $P_e=5$ bar) can be realized within predetermined limits with any air ratio $\lambda$. The lowest fuel quantity is required at an air ratio of somewhat less than $\lambda=1.1$. This follows from the fact that the curves for a constant fuel quantity are at their maximum with $\lambda$ in the range of $\lambda=1.1$. By contrast, the power maximum for the curves for constant air quantity is reached with $\lambda$ in the range of $\lambda=0.9$. In the first case, that is, for a predetermined constant fuel quantity, the internal combustion engine attains maximum power if the amount of air is metered such that the air-fuel ratio assumes a value of $\lambda=1.1$. If, in a fuel injection system, the air is supplied such that a power maximum results, the internal combustion engine is automatically operated within the range of a minimum specific fuel consumption.

In the second case in which the internal combustion engine is operated at a predetermined constant air quantity to provide a maximum output at $\lambda=0.9$, operation at maximum power is present. This relationship will become clear from FIG. 1b wherein the air and the fuel quantity to be metered in dependence on $\lambda$ are shown for a predetermined constant mean effective pressure. This mean effective pressure is attained with a minimum of fuel if the Lambda value of the air-fuel mixture is $\lambda=1.1$. Thus, this point is identical with the minimum specific fuel consumption be$_{min}$. By contrast, the minimum air quantity with which this mean effective pressure can be attained requires an air-fuel ratio with Lambda in the range of $\lambda=0.9$. Thus, with a predetermined air quantity, it is at this point when the output of the internal combustion engine reaches its maximum $P_{max}$.

In view of these relationships, the following control methods present themselves for metering the air-fuel mixture to an internal combustion engine. In the entire part-load range, the control objective is a minimum specific fuel consumption, that is, a control to the maximum of the curves shown in FIG. 1a in broken lines (be$_{min}$-control). Under full-load conditions, however, the control objective is a power maximum, that is, a control to the maximum of the curves shown in FIG. 1a in full lines ($P_{max}$-control). Since in either case the desired value is a maximum output of the internal combustion engine at a predetermined fuel or air quantity, an optimizer method would be an obvious application. However, it is also possible to consider a Lambda characteristic field control in which the corresponding Lambda values of the air-fuel mixture are predetermined in dependence on the output of the internal combustion engine.

Control systems for internal combustion engines such as a Lambda control, knocking control or ignition point control respond to disturbances only relatively slowly because of existing dead times or operating times. Therefore, it has proved to be particularly advantageous to utilize an anticipatory control for the fast and dynamic processes occurring within the internal combustion engine. The superposed control may operate on these anticipatory control values in a multiplicative or also additive fashion, for example.

The use of advanced electronic means such as memories and microcomputers also makes it possible to implement the anticipatory control by a characteristic field the values of which can be addressed in dependence on, for example, the rotational speed and the load of the internal combustion engine. In such an arrangement, the superposed control may then act on the characteristic field values read out multiplicatively or additively, without altering the characteristic field values stored in the memory. On the other hand, it is also possible to modify the characteristic field values per se by means of the superposed control. If the influence of disturbances is taken into account continuously by modified characteristic field values, the characteristic field is referred to as being self-adaptive or learning. As will be seen in the following, a combination of the two methods last described can also prove to be very advantageous.

The basic structure of the system utilizes a characteristic field which in its simplest form has the rotational speed n and the throttle flap position $\alpha$ as input quantities. On initialization, relatively coarse initial values are entered into this characteristic field. In subsequent operation, a continuous adaptation is performed. An essential concept is to subdivide the characteristic field into a number of operating ranges comprising, for example, idling, part-load, full-load and overrunning. With the exception of the overrun mode of operation, a specific control concept is provided for each range which adapts this particular range to the applicable requirements so that a "learning" characteristic field is obtained. If the internal combustion engine is turned off, the possibility exists to store the characteristic field learned last and to use it as an initial characteristic field on a new start.

FIG. 2 shows the block diagram of a first embodiment of the overall system. The fuel quantity to be metered to the internal combustion engine is controlled by a characteristic field 20 receiving the rotational speed n and the position α of a throttle flap 21 as input quantities. The position of the throttle flap is determined by an accelerator pedal 22. The duration of injection $t_i$, which is stored in characteristic field 20, is converted into a corresponding fuel quantity $Q_K$ via an injection valve 23. This fuel quantity $Q_K$, as well as the air quantity $Q_L$ which is determined by the throttle flap position, are passed to a symbolically illustrated internal combustion engine 24 thereby resulting in a specific torque M which is produced in dependence on the Lambda value of the air-fuel mixture. The controlled portion "internal combustion engine" can be approximated schematically by an integrator 25. The output quantity n of the internal combustion engine is used as an input into the characteristic field 20. This part of the overall system so far described relates to a pure control of the mixture composition.

In this embodiment, the superposed control is based on an extreme-value control. Therein, depending on the control method utilized (see description further below), either the air quantity $Q_L$ is wobbled over the increment $\Delta Q_L$ via a bypass, for example, or the duration of injection $t_i$ is wobbled over the increment $\Delta t_i$. The test signals required for this purpose are produced by a test signal generator 26. Depending on the control method utilized, this test signal generator 26 operates on the fuel quantity or on the air quantity. The wobble frequency chosen can be constant or depend on the rotational speed. The engine torque changes produced by the test signal become perceptible as rotational speed changes thereby enabling a measuring device 27, to which signals proportional to the rotational speed are applied, to analyze these torque changes.

Measuring device 27 comprises a preferably digital filter 28 and a follow-on evaluating unit 29 evaluating the filtered signal with regard to amount and/or phase and comparing it with the output signals of test signal generator 26. It has been shown to be advantageous to use digital technology for the filter 28. It operates with discrete values of time, and the sampling frequency may correspond to a fixed time slot pattern or, alternatively, it may be proportional to the rotational speed. Because the filter 28 is accurately adjusted to the wobble frequency, disturbance signals can be largely suppressed. A control unit 30 compares preferably the phase position of the filter output signal with a desired phase value, with the difference between these two signals being passed to an integrator 31 which in its simplest form may be configured as an up/down counter. One of the uses of the output signal of the integrator 31 is to act upon the characteristic field multiplicatively. As will be seen further below, characteristic field learning methods in which individual regions of the characteristic field are selectively adapted may also be useful. Such methods are illustrated schematically by block 32.

Figure 3:
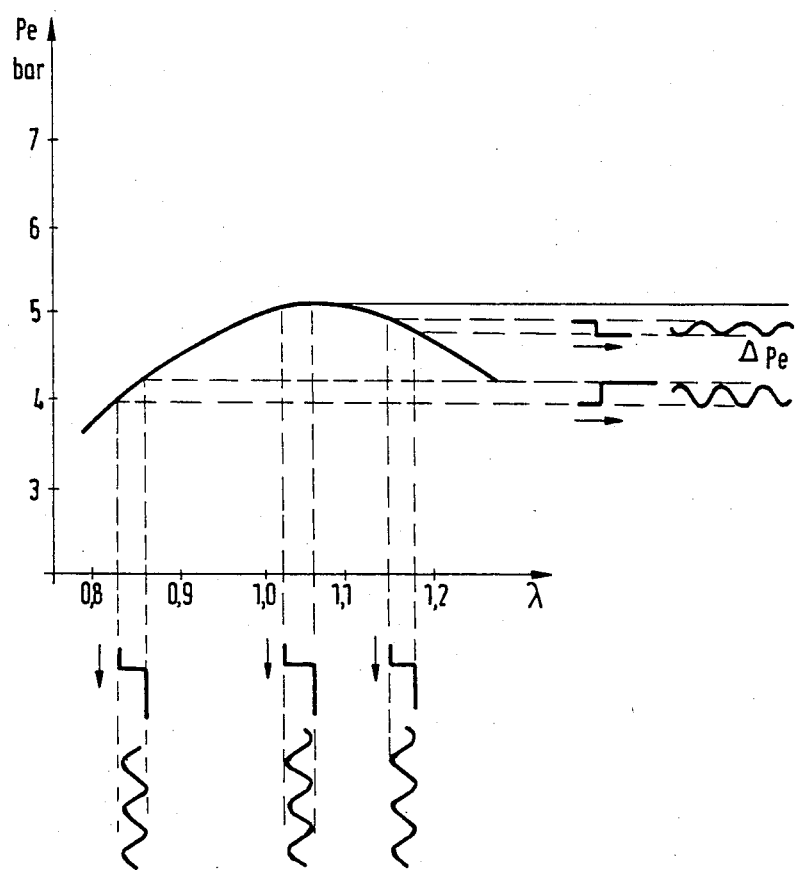
FIG. 3 is a schematic representation of an optimizer system.

To explain the operation of the system of FIG. 2, reference is now made to FIG. 3 showing the principle of operation of an extreme-value control system.

FIG. 3 shows the mean effective pressure $P_e$ as a function of the Lambda value of the air-fuel mixture. A test signal occurring either sporadically and having, for example, the shape of a step function or occurring periodically and being of sinusoidal or rectangular shape is superposed on the input quantity, namely, the air-fuel mixture, with Lambda being a predetermined value. The response of the internal combustion engine to these test signals can be detected through the change in the mean effective pressure $P_e$. However, the response is preferably detected via the torque change or the rotational speed change corresponding to the latter. As becomes apparent from FIG. 3, either the amplitude change of the mean effective pressure (or of the torque or rotational speed) or the phase of this output quantity in relation to the phase of the test signals is suitable as the quantity to be analyzed.

In the $be_{min}$-control method, the test signal is superposed on the input quantity by air wobbling via a bypass, for example, whereas in the $P_{max}$-control method, the superposition is accomplished by wobbling the fuel quantity to be metered or the duration of injection. These control methods are applied in the embodiment of FIG. 2.

Via throttle valve 21 as well as the α-n characteristic field 20 for the duration of injection, a coarse anticipatory control of the Lambda value of the air-fuel mixture is predetermined. The superposed control comprises a test signal generator 26, a measuring device 27 evaluating the rotational speed changes, and a control unit 30 influencing the characteristic 20. Depending on the control method applied, either the air quantity to be metered is wobbled over the increment $\Delta Q_L$ or the fuel quantity to be metered is wobbled over the change in the duration of injection $\Delta t_i$, for example.

According to FIG. 2, the signals of test signal generator 26 act on either the air quantity or the fuel quantity to be metered, depending on the load condition. The response of the internal combustion engine 24 to such wobbling of the air-fuel mixture supplied can be analyzed on the basis of changes in the rotational speed, for example. For this purpose, a measuring device 27 is used which in this special embodiment comprises a digital filter 28 for the suppression of disturbances and an evaluating unit 29 for evaluating the rotation speed changes with regard to amount and phase. The output quantity of measuring device 27, which indicates the actual value of the rotational speed changes, is compared with the desired value $\Delta n = 0$ of rotational speed changes typical for an extreme-value control. The difference between actual and desired values then acts via blocks 31 and 32 on characteristic field 20 in a different manner still to be described.

For clarification of the operation of evaluating unit 29, FIG. 4 shows the output signal of the band-pass filter. The upper graph illustrates the amplitude as a function of Lambda while the lower graph shows the phase relationship for two Lambda values above and below the ideal value, namely, the point $be_{min}$ to which FIG. 4 is directed. For a control to a power maximum $P_{max}$, the resulting relationship would be the same wherein only the Lambda value would be in the rich range. The output amplitude of the band-pass filter is a measure of the magnitude of the rotational speed changes. By analogy with the diagrams of FIG. 3, the change in the band-pass output amplitude becomes zero precisely at the extreme value. Deviating from the optimum value on either side, the amplitude rises steadily. However, the value of the amplitude alone provides no indication as to which side of the extreme value is concerned. Therefore, the extreme value is determined by evaluating the phase of the output signal of filter 28. It would also be possible to use the amplitude change as the measuring quantity.

The lower part of FIG. 4 shows a test signal of arbitrary shape which in the embodiment shown is rectangular and, by comparison thereto, the filter output signal. The phase displacement of the filter output signal relative to the test signal varies depending on whether the Lambda value of the air-fuel mixture is above or below the $be_{min}$-point. The phase relationship thus provides a clear indication of whether the mixture is too rich or too lean relative to $be_{min}$-point.

In control unit 30 of FIG. 2, a comparison takes place between the phase position of the output signal of filter 28 and a desired phase value for the $be_{min}$-point. In the simplest case, the difference between these two signals is integrated. In a digital embodiment, an up/down counter, for example, may be used for this purpose. The counter reading corresponds to a factor by which the injection characteristic is multiplied or by means of which a specific characteristic range is modified. In the $be_{min}$-control, the air has to be wobbled, so that with the large distance between the throttle valve bypass with which the air quantity is wobbled and the cylinders, operating times arise which limit the wobble frequency. Because of the existence of resonance frequencies specific to the vehicle, the desired phase value for the $be_{min}$-point can be shifted in dependence on rotational speed and possibly also in dependence on load.

A $P_{max}$-control is provided for the upper load range; its purpose is to ensure that at high loads the internal combustion engine invariably delivers the maximum possible power for the given throttle flap position. In this embodiment, however, it is not the air but the fuel quantity that is wobbled over the duration of injection, for example. The configurations of measuring device and control unit are identical.

In view of the fact that the injection valves are located immediately before the intake valves of the individual cylinders, substantially shorter operating times occur compared to those of the $be_{min}$-control. In the four-cylinder engine of this embodiment which uses single-channel injection, that is, injection valves connected in parallel with two injections for every two crankshaft revolutions, it is always at least two pulses that have to be enriched and two pulses that have to be leaned out. From this ensues the maximum possible wobble frequency which is about four times the wobble frequency of the $be_{min}$-control. Filter 28 is of course suitably adapted.

Figure 5:
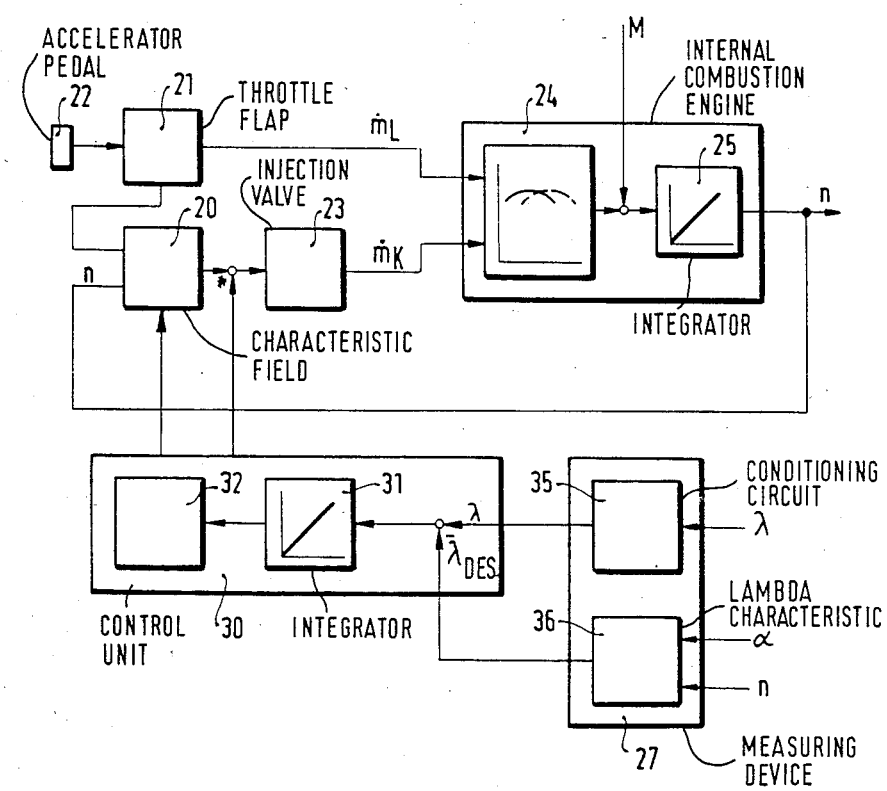
FIG. 5 is a block diagram of a second embodiment incorporating a Lambda control system.

FIG. 5 illustrates a second embodiment of the overall system in which a Lambda control is substituted for the extreme-value control superposed on the anticipatory control. Blocks identical with those of FIG. 2 have been assigned identical reference numerals and will not be explained further in the following.

The difference of the subject matter of FIG. 5 to that of FIG. 2 lies in that characteristic 20, in which the durations of injection $t_i$ in dependence on throttle position α and rotational speed n are stored, is influenced by the output signals of an oxygen sensor exposed to the exhaust gas of the internal combustion engine. In the embodiment shown, measuring device 27 comprises a desired Lambda characteristic 36 receiving as inputs the throttle flap position α and the rotational speed n, and a conditioning circuit 35 to which the oxygen sensor (not shown) is connected. A variety of embodiments may be used for the oxygen sensor; for example, it may be a (λ=1) sensor, a heated lean sensor or a limiting-current sensor as they are all sufficiently known from the pertinent literature. In addition, the subject matter of FIG. 5 is not restricted to oxygen sensors but comprises any type of exhaust gas sensor as they are known, for example, as CO sensors or also exhaust gas temperature sensors.

The desired Lambda characteristic stores predetermined fixed Lambda values applicable to the various operating conditions of an internal combustion engine, in dependence on the parameters throttle position α and rotational speed n. A comparator compares these desired Lambda values, which in the simplest case assume the value λ=1, with the actual Lambda values provided by conditioning unit 35. The difference between actual and desired Lambda values is passed to blocks 31 and 32 connected in series which, in turn, either act multiplicatively on characteristic 20 or influence selected regions of the characteristic dependent upon operating parameters. For the desired Lambda characteristic 36, the following rough reference value which, of course, may vary from one vehicle type to another can be preset. For the full-load and idling ranges, the desired Lambda values are in the neighborhood of λ=1, and for the part-load range they are of the order of λ>1.

By contrast with the first embodiment of FIG. 2, this second embodiment affords the advantage of keeping the electronic and mechanical complexity of the control superposed on the anticipatory control within reasonable limits. This embodiment not only dispenses with the need for a test signal generator and the mechanical controlling element for wobbling the air quantity supplied, but it also provides a relatively uncomplicated configuration for the measuring device 27 which includes the conditioning unit 35 and the desired Lambda characteristic 36. On the other hand, it requires a very accurate and balanced presetting of the characteristic values of the desired Lambda characteristic which, moreover, may assume different values in dependence upon the type of internal combustion engine involved.

In particular for the embodiment of FIG. 2 in which an air bypass is provided for wobbling the air quantity supplied, an idle air charge control may be used advantageously by means of which the idle speed of the internal combustion engine is kept constant independent of load changes as they are caused, for example, by turning on the air conditioner or the like. Such an idle air charge control is known, for example, from U.S. Pat. No. 4,478,186.

In the following, the principle of adaptation of characteristics as they are already known for injection systems, carburetor systems and also ignition systems will be explained in more detail.

The methods of adapting a characteristic field may be roughly classified with reference to FIG. 6. FIG. 6a shows a configuration wherein the characteristic field values for an anticipatory control of the duration of injection remain unchanged; however, the characteristic field output quantities may be subject to multiplicative or also additive corrections by means of the superposed control. The characteristic field values per se cannot, however, be modified by the superposed control. The advantage of this method is that it can be implemented simply and at low cost. Its disadvantage is that a characteristic field, once predetermined, can no longer be modified with respect to its structure.

By contrast, FIG. 6b shows a characteristic field learning method in which the individual values of the characteristic field are continuously adapted by the superposed control. More precisely, this means that at any operating point predetermined by the input quantities, the characteristic field output quantity corresponding thereto is adapted to the then optimum value by a control method. On leaving the operating point, the output quantity last determined is stored in memory and remains unchanged until this particular operating point is again selected. It is an advantage of this method that the characteristic field can be adapted to any desired structure. It is less an advantage that it requires all characteristic field output quantities to be accessed individually to change the entire characteristic field. However, this is not always feasible because, on the one hand, there are operating points which are accessed very rarely only or not at all and, on the other hand, because the dwell time in the individual operating points is often so short that an adaptation cannot take place.

The disadvantages of these two methods can be advantageously eliminated by a compromise which lies between these two extreme possibilities. In addition to the directly selected output quantity, a range around this quantity is influenced. This influence on adjacent characteristic field values diminishes as the distance from the respective output quantity increases. A particular advantage of this compromise is that it permits nearly any adaptation of the characteristic field and also provides for the influencing of regions which otherwise are never or only rarely selected.

The above-described adaptation methods will now be explained with reference to FIG. 7 showing a sectional view of an actual-value characteristic field illustrated in the form of a histogram with the desired values being identified by a continuous line. FIG. 7a shows the adaptation of individual values, the selected output quantity being identified by an arrow. Although this individual value is correctly adjusted to the course of the desired value characteristic field by the control, the structure of the course of the actual-value characteristic field cannot be made to follow the desired value until after all characteristic field values have been accessed. On leaving the selected output quantity to access a characteristic field quantity in the close vicinity, this quantity has to be adapted in a direction similar to the previous values.

The other extreme case which is a multiplicative adaptation of the entire characteristic field is illustrated in FIG. 7c. The deviation of the characteristic quantity (identified by an arrow) from the desired value yields a factor which, while correctly adapting the corresponding characteristic field value, modifies all other characteristic field values in the same sense. As appears from the desired-value course selected, such a multiplicative adaptation does not accurately attain the desired-value course of the characteristic field.

For a combination of these two methods as it is schematically shown in FIG. 7b, various adaptation possibilities exist. One possibility is to subdivide the characteristic field into support points. In the simplest case, values between the support points are computed by linear interpolation, for example. In adapting the characteristic field to the corresponding desired value, only the support points are changed, resulting in an adaptation of the adjacent regions by interpolation. In this method, the environment of the modified support point is automatically changed in the same sense as the support point itself, yet less weighted as the distance from the support point increases. In this characteristic field learning method, it is not necessary to access each single characteristic field quantity for modification. This means that on the one hand, an adaptation of the characteristic field is executed very rapidly and that, on the other hand, any predetermined structure is adaptable at least by approximation.

Another slightly modified learning method will be explained briefly with reference to FIG. 5. The characteristic field 20 for the duration of injection receives the input quantities of rotational speed n and throttle flap position α as load information. The mixture is to be adjusted to a predetermined Lambda value by means of a Lambda control. For this purpose, a control unit which may be an integral-action controller, for example, determines a factor by which the duration of injection is multiplied. In FIG. 5, this controller may be identified by block 31. The multiplication factor is continuously active, with the controller being so tuned that the recovery time constant is as small as possible. The characteristic field is influenced in dependence on this factor. Due to system-inherent operating times, the control factor is not always constant, not even in steady-state operation, but is time-varying. For this reason, the control factor is suitably averaged whereby the averaged control factors are then incorporated into the characteristic field only at predetermined times. Upon incorporation, the control factor is reset to one. This measure has the advantage of affording a reliable adaptation of the characteristic field, although it may lengthen the duration of the adaptation process.

Figure 8:
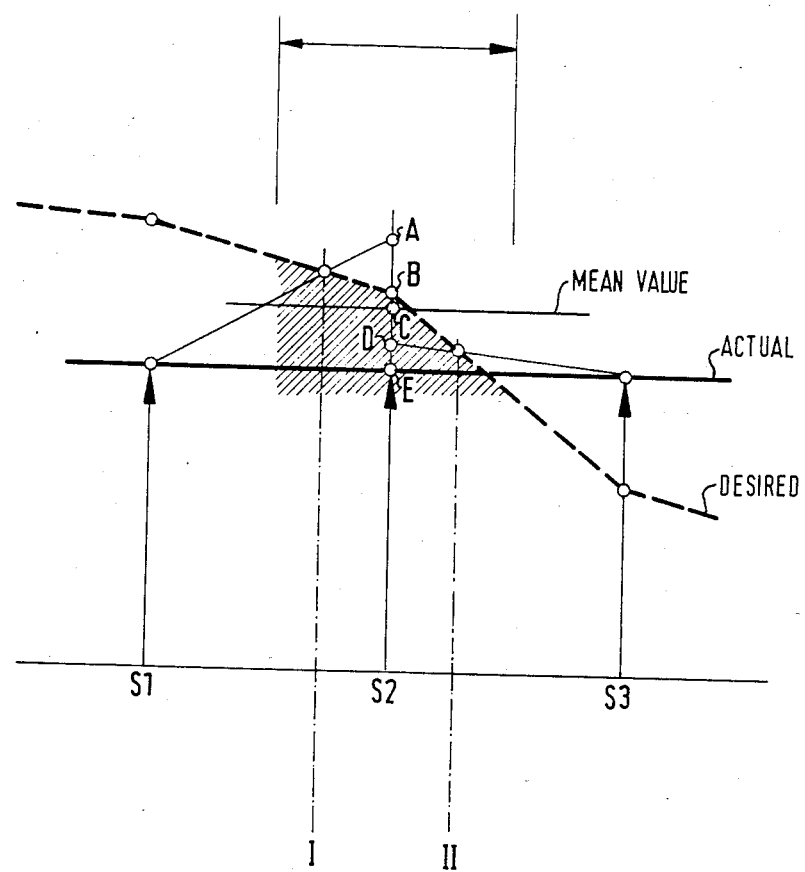
FIG. 8 is a diagram showing the characteristic field learning method.

The advantages of such a mean-value formation will be explained with reference to FIG. 8. For reasons of simplicity, only three support points S1, S2, S3 are shown which all assume the same value. Accordingly, the actual-value characteristic drawn as a thick continuous line is a straight line. In this embodiment, the desired-value characteristic drawn in broken lines deviates substantially from the actual-value characteristic. Each support point is surrounded by a defined region which, in the special embodiment shown, corresponds to half the distance between two adjacent support points, as indicated with reference to support point S2 in the drawing.

Each support point can only be changed if one or several operating points within the surrounding region of the respective support point are accessed. If, for example, operating point I has been accessed for some time, agreement between the desired and the actual value (provided a linear interpolation applies) can be attained at this operating point only if the value of support point S2 is raised from its initial value E to the new value A. In contrast, if one starts from operating point II, then the value of support point S2 has to be raised to value D to have agreement between the desired value and the actual value at operating point II. In both cases, the support point has not assumed its correct value which should be at B. It will be seen from this illustration that the adaptation yields better results the closer the operating point lies to the support point. On the other hand, it also becomes apparent that with one single operating point in the neighborhood of the corresponding support point, it is not always possible to perform an accurate adaptation of the support point.

However, a possibility presenting itself is not to proceed immediately with the influencing of the support point but to average the correction values as long as the operating point is within the region of the support point. When the operating point leaves this region, the support point is corrected by this mean value. In the embodiment shown, this procedure would result in point C for support point S2. Although this value does not exactly correspond to the desired value B either, it is already quite close to the desired value. If further operating points are accessed within the region of the corresponding support point, the continuous averaging of the computed values causes the actual value of the support point to continuously approximate its desired value.

Figure 9:
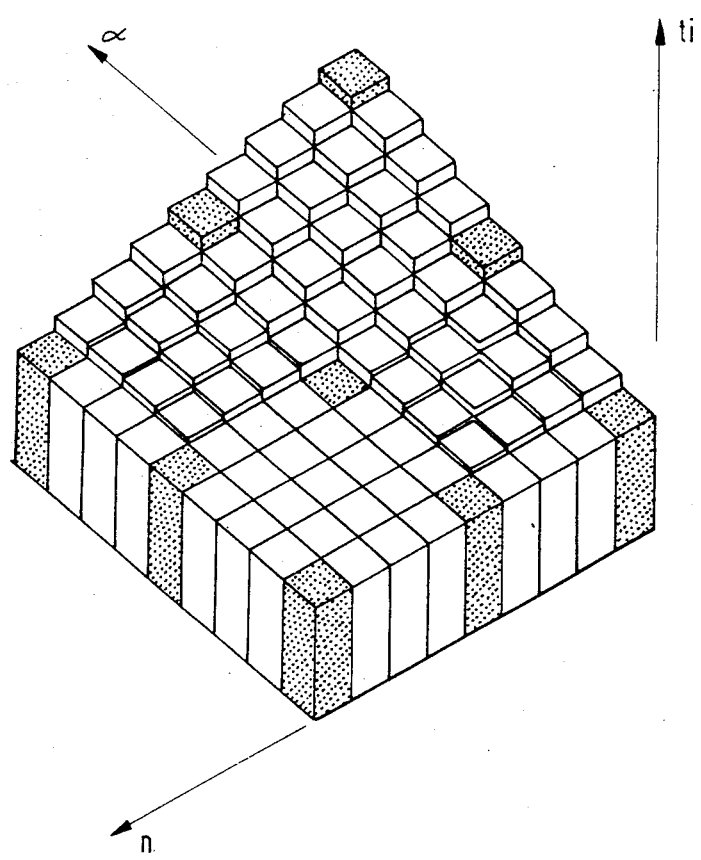
FIG. 9 shows sections of a characteristic field with support points.

FIG. 9 shows a section from a randomly selected characteristic field. The input quantities, which in the embodiment shown are the rotational speed n and the throttle flap position $\alpha$, are quantized, and each combination of input quantities is assigned an output quantity, namely, the duration of injection $t_i$. Implemented by hardware, the output quantities are stored in a read-write memory, with the input quantities determining the address within the memory. In the present embodiment, a characteristic field with $3 \times 3$ support points identified by dots in the FIG. 9 was chosen as a simple example. By linear interpolation it is possible to compute also three values lying between two adjacent support points, resulting in a total of 81 characteristic field values for the special embodiment shown.

The formation of a mean value from the correction values within the region of a support point as described above shall now be explained with reference to FIG. 10. The upper illustration is a section showing nine support points ($3 \times 3$), with the hatched area defining the catchment region of one of the support points. The driving curve is given by the time change of the input quantities of the characteristic field, which in this embodiment are the throttle flap position $\alpha$ and the rotational speed n, and is illustrated as a continuous line. At point A and at time $t_a$, this curve enters the catchment region of the selected support point, leaving this region after a specific period of time at point B and at time $t_b$.

Figure 10A:
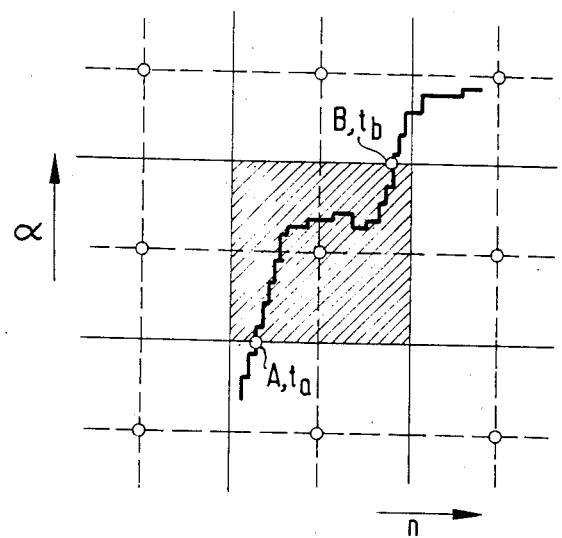
FIGS. 10a and 10b are diagrams showing the characteristic field learning method with mean-value formation.
Figure 10B:
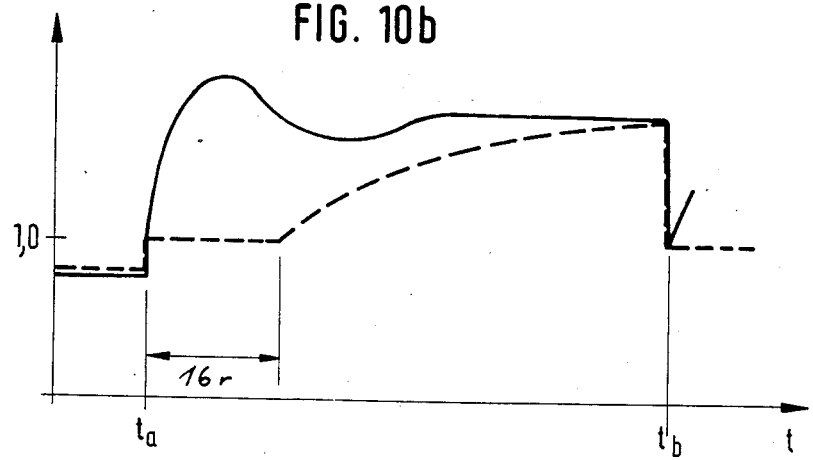

The lower illustration of FIG. 10 shows the clear course of the control factor curve (solid line) in the time period between $t_a$ and $t_b$ as well as the time-averaged control factor curve (broken line). The averaging procedure is carried out as described below.

When the driving curve changes from the catchment region of one support point to the catchment region of another support point (at time $t_a$, $t_b$), the support point of the catchment region just left is adapted, if necessary, and the control factor is reset to the neutral value of unity. The control factor is averaged at the time when the driving curve is within the catchment region of a support point. It may prove an advantage in this method that the averaging to form the mean value is not started until after a given number of revolutions (16, for example) of the internal combustion engine. This permits overshoot to be disregarded and also a distinction to be made between dynamic and steady-state modes of operation of the internal combustion engine. A first-order low-pass filter which is preferably digital is used for averaging. When the driving curve leaves the particular catchment region, this averaged value is incorporated into the support point wholly or possibly only in part. Subsequent thereto, the control factor is set to the neutral value of unity.

Typical of this learning method is the fact that the properties of the existing control loop are maintained unchanged. Within the vicinity of a support point, the control factor continues to influence the correcting quantity directly. Only after a clear change tendency is established by averaging several correction values within the region of a support point, will the change be incorporated into the relevant support point after the curve has left this particular support point region. As a result of the interpolation method, the correcting quantity will experience a jump which, however, has no adverse effect. It may prove useful to reset the control factor by a computation process such that a jump is avoided.

A change limiter using the initial state of the characteristic field as a reference ensures that the characteristic field is always maintained operative even in the event of a disturbance. At the same time, the limiter can be used to signal a warning because its response indicates in all probability that a major defect has occurred in the control loop or the engine. Having the characteristic field in its initial state further permits a convenient emergency mode of operation.

Figure 11:
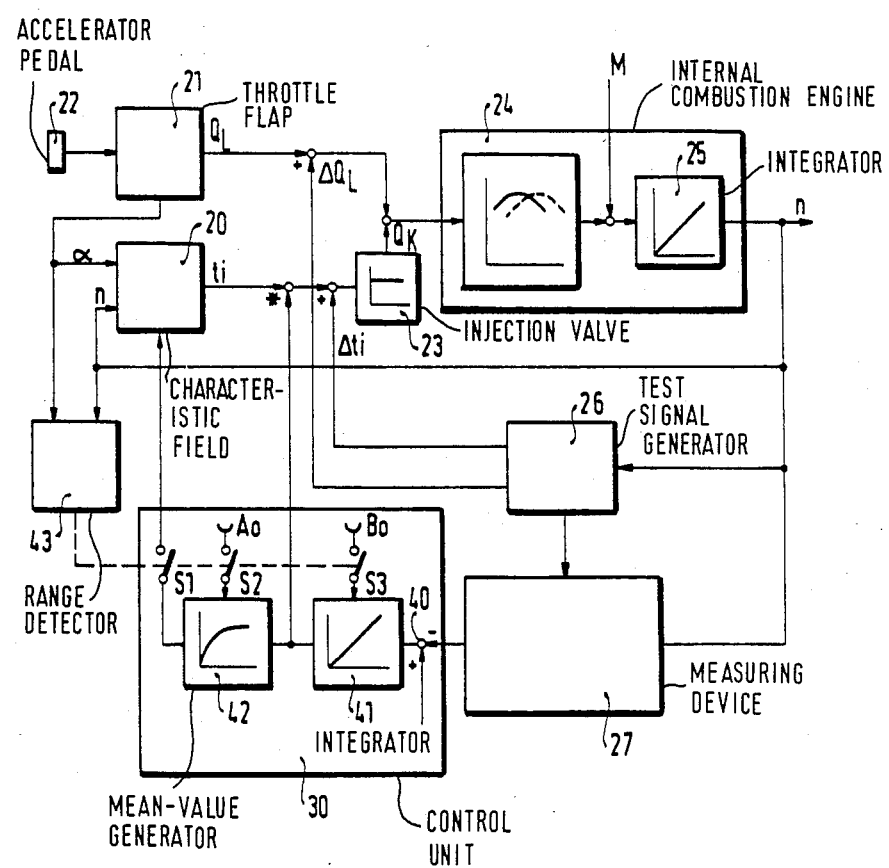
FIG. 11 is a block diagram of a third embodiment.

The block diagram of FIG. 11 is identical with the block diagrams of FIGS. 2 and 5 with respect to the anticipatory control of the mixture composition and shows an embodiment of the characteristic field learning method including a mean-value generator. Although in this embodiment the control superposed on the anticipatory control is configured as an extreme-value control, it does not affect the principle of the characteristic field learning method shown. Equally, it would be possible to substitute, for example, the Lambda control illustrated in FIG. 5 [($\lambda=1$)-control, lean control or the like] for the extreme-value control. In any case, the output signals of the measuring device 27, whatever its type, are conducted to control unit 30. The output of a comparator 40 in which the actual value is compared with the desired value is applied to a component 41 which in the embodiment shown is preferably an integrator. The output signals of integrator 41 act multiplicatively on the output quantity $t_i$ of characteristic field 20. In addition, the output signals of integrator 41 are applied to a mean-value generator 42 which, in turn, has an output that operates on the individual characteristic field or support point values of characteristic field 20. The connection between mean-value generator 42 and characteristic field 20 can be interrupted by a switch S1. Further, additional switches S2 and S3 are provided which are adapted to reset the mean-value generator 42 and the integrator 41 to predetermined initial values $A_O$ and $B_O$, respectively. The switches S1, S2 and S3 are controlled by a range detector 43 receiving the throttle flap position $\alpha$ and the engine speed n as input quantities.

In this connection, it is to be emphasized again that the parameters throttle flap position $\alpha$ and rotational speed n which characterize the operating condition of the internal combustion engine are exemplary only. Other parameters such as intake pipe pressure, air quantity, air mass or exhaust gas temperature could equally be used as input quantities.

As already mentioned with reference to FIG. 10, each support point is assigned a defined catchment region. As long as the driving curve of the internal combustion engine is within such a catchment region, the correction factor is averaged in the mean-value generator 42, possibly after a delay time dependent on, for example, the engine speed; the characteristic itself is, however, not influenced. The value issued from characteristic field 20 is permanently influenced by the output signal of control unit 30.

As soon as the driving curve leaves the catchment region of the support point, the region detector will sense this condition and actuate the three switches S1, S2 and S3. By means of switch S1, the averaged correction value can be incorporated into the support point last accessed. In addition, switches S2 and S3 will reset the mean-value generator 42 and the component 41 to their initial values $A_O$ and $B_O$, respectively. In the same manner, this learning process can be carried out for the next support point accessed.

Figure 12:
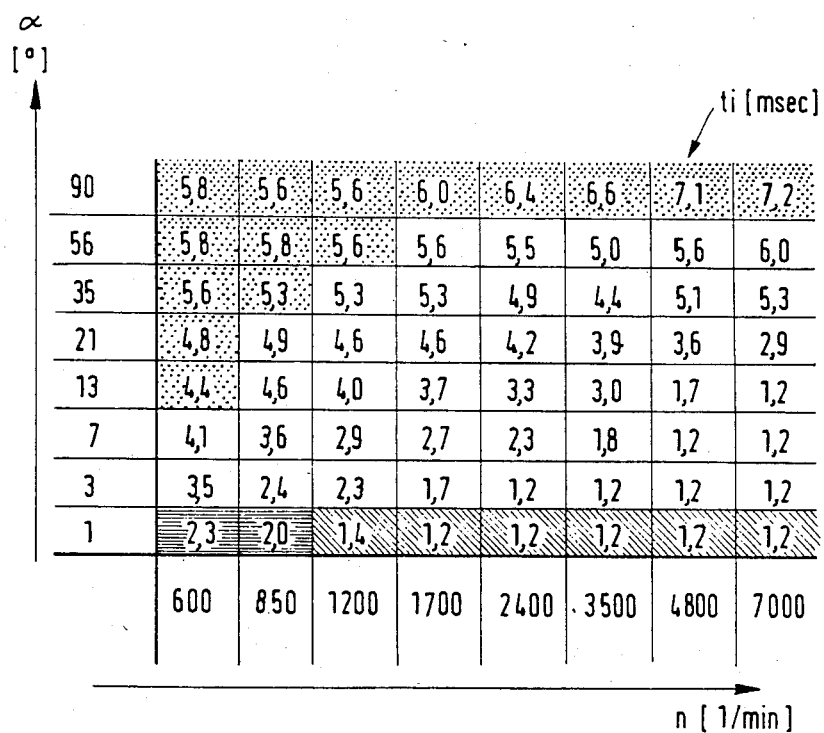
FIG. 12 is an $\alpha$-n characteristic field for the duration of injection $t_i$.

Complementing the above, FIG. 12 shows a characteristic field for the durations of injection $t_i$ (in milliseconds). The input quantities are again the throttle flap position α (in degrees) and the rotational speed n of the internal combustion engine (in revolutions per minute). In FIG. 12, the characteristic comprises 8×8 support points, that is, eight speeds and eight throttle flap positions. The 64 values for the output quantity $t_i$ are stored in a read-write memory, for example, and can be changed using the above-described control methods -control, $P_{max}$-control methods) in the variously hatched regions. For small throttle flap angles and speeds below about 1,000 rpm, the speed is controlled by means of an idle speed control with a $be_{min}$-control superposed thereon. For higher engine speeds with the throttle flap almost closed, the internal combustion engine is in the overrun cutoff mode of operation. Over a large unhatched area, the part-load range, a $be_{min}$-control of the mixture supplied to the internal combustion engine is appropriate. By contrast, particularly with the throttle flap fully or almost fully opened and at low engine speeds, a control directed to maximum power, that is, a $P_{max}$-control, is suitable. These different control methods can be implemented using, for example, an arrangement as shown schematically in FIG. 2.

Further, various enrichment functions such as warm-up or acceleration enrichment are provided. In warm-up enrichment, the mixture is enriched via a temperature-dependent warm-up characteristic, with the characteristic itself remaining unaffected. In acceleration enrichment, however, a temporary change in the wetting of the wall of the intake pipe has to be compensated for. The temporarily resulting adaptation error can be corrected by raising the fuel quantity by a factor corresponding to the time change of the throttle flap position. Because the throttle flap position is used as an input quantity for acceleration enrichment, this enrichment responds very rapidly.

Figure 13:
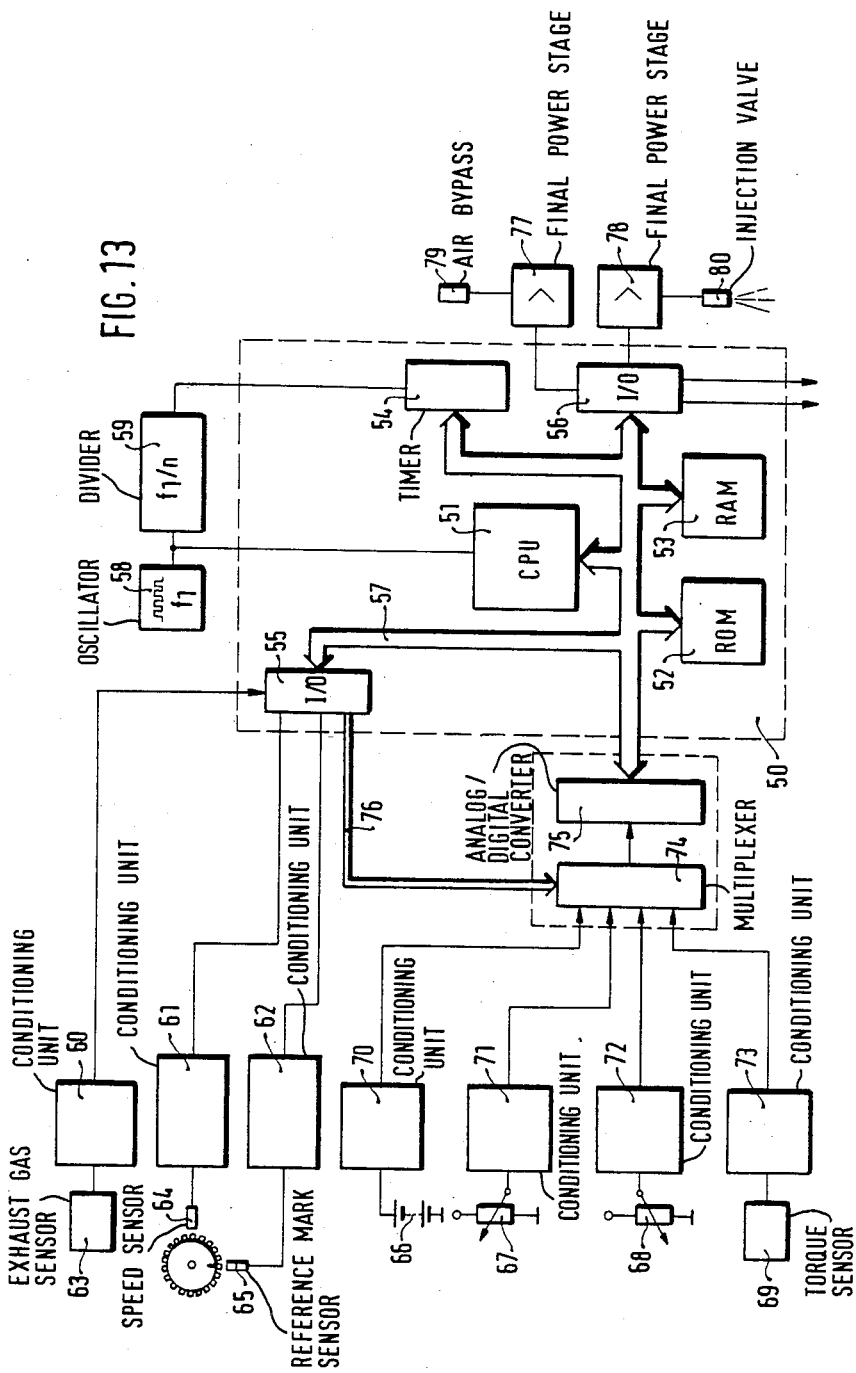
FIG. 13 is a circuit diagram for an $\alpha$-n anticipatory mixture control including an additive control system.

FIG. 13 illustrates schematically the hardware configuration for implementation of a α-n mixture anticipatory control including a superposed adaptive control by means of a microcomputer (INTEL 8051, for example) and the pertinent periphery. In a microcomputer 50, a CPU 51, a ROM 52, a RAM 53, a timer 54, a first I/O unit 55 and a second I/O unit 56 are interconnected via an address and data bus 57. For time control of the program flow in the microcomputer 50, an oscillator 58 is used which is connected to the CPU 51 directly and to the timer 54 via a divider 59. The first I/O unit 55 receives the signals of an exhaust gas sensor 63, a rotational speed sensor 64 and a reference mark sensor 65 via conditioning units 60, 61 and 62, respectively.

Further input quantities are the battery voltage 66, the throttle flap position 67, the coolant temperature 68 and the output signal of a torque sensor 69. Via respective conditioning units 70, 71, 72 and 73, these quantities are applied to a multiplexer 74 and an analog-to-digital converter 75 connected in series. The outputs of the analog-to-digital converter 75 are connected to the bus 57. The functions of multiplexer 74 and analog-to-digital converter 75 may be executed by chip 0809 manufactured by National Semiconductor, for example. Multiplexer 74 is controlled via a line 76 connecting it to the first I/O unit 55. The second I/O unit 56 controls an air bypass 79 and injection valves 80 via final power stages 77 and 78, respectively. Further output signals of I/O unit 56 may be utilized for diagnostic or ignition open-loop and closed-loop control purposes.

Not all of the input and output quantities illustrated in FIG. 13 are absolutely necessary for all of the control methods so far described. For an extreme-value control directed to minimum fuel consumption or maximum power by wobbling the air bypass 79 or the fuel quantity (injection valves 80), respectively, the exhaust gas sensor 63, conditioning unit 60, torque sensor 69 and conditioning unit 73 may be omitted. If the air ratio Lambda is controlled instead of this extreme-value control, torque sensor 69, conditioning unit 73, final stage 77 and air bypass 79 may be omitted. The torque sensor 69 and conditioning unit 73 are necessary for a modified control method still to be described.

The program flow for an extreme-value control as shown in FIG. 2 is presented by way of example and will now be explained in more detail with reference to the following flowcharts. The other control methods already described or still to be described can be implemented in a simple manner applying changed input quantities and suitably modifying the program structure which presents no difficulties to those skilled in the art.

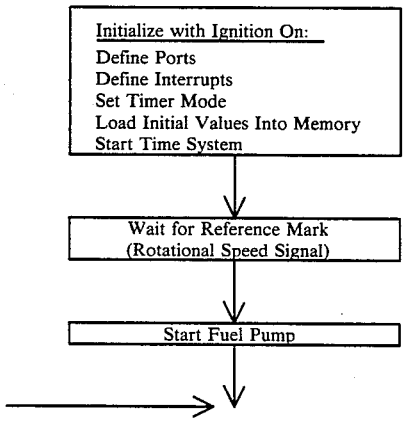

Flowchart No. 1: Main Program

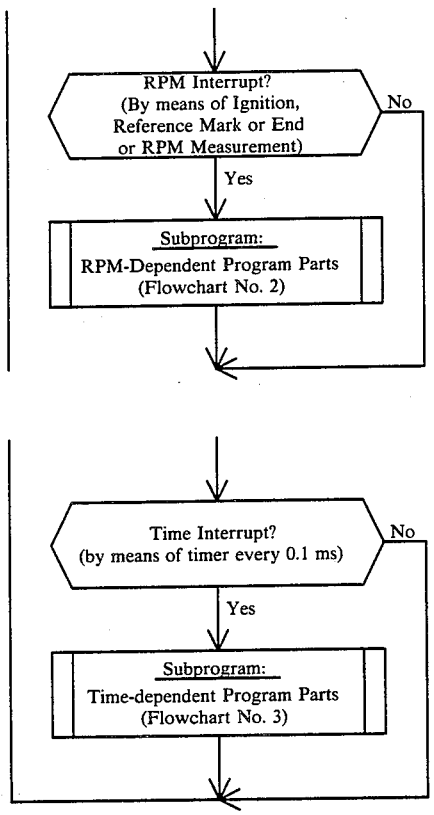
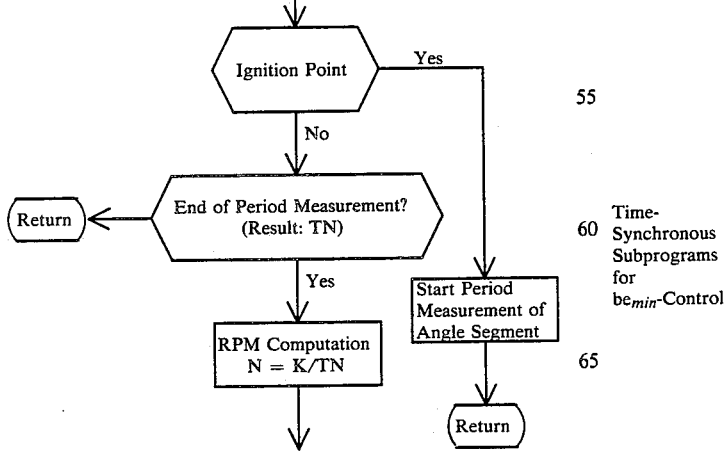
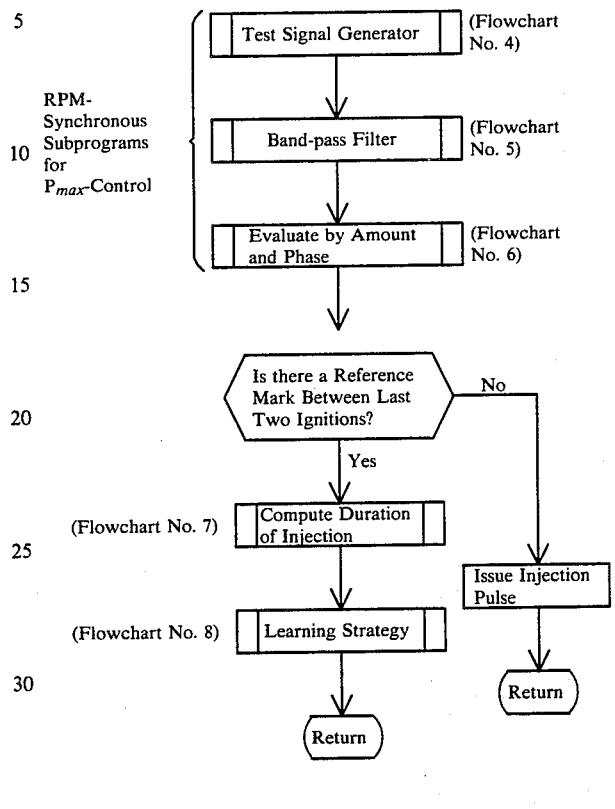
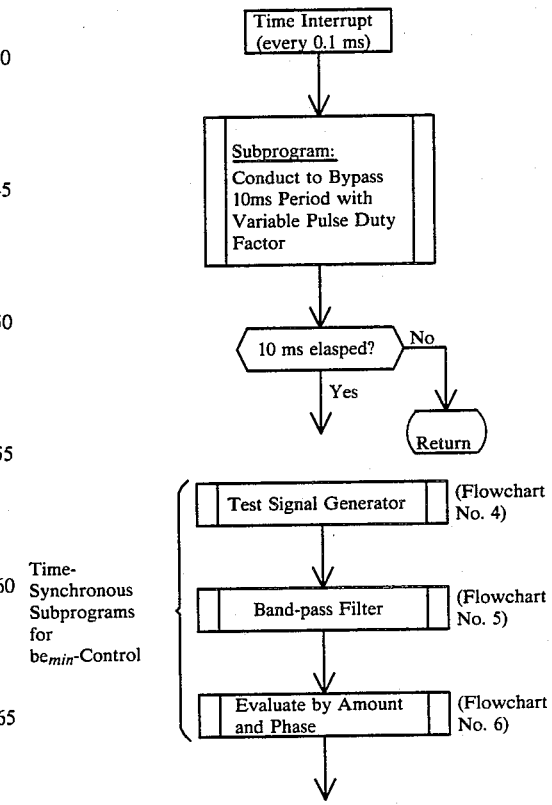

-continued

Flowchart No. 3:

Subprogram for Time-Dependent Program Parts

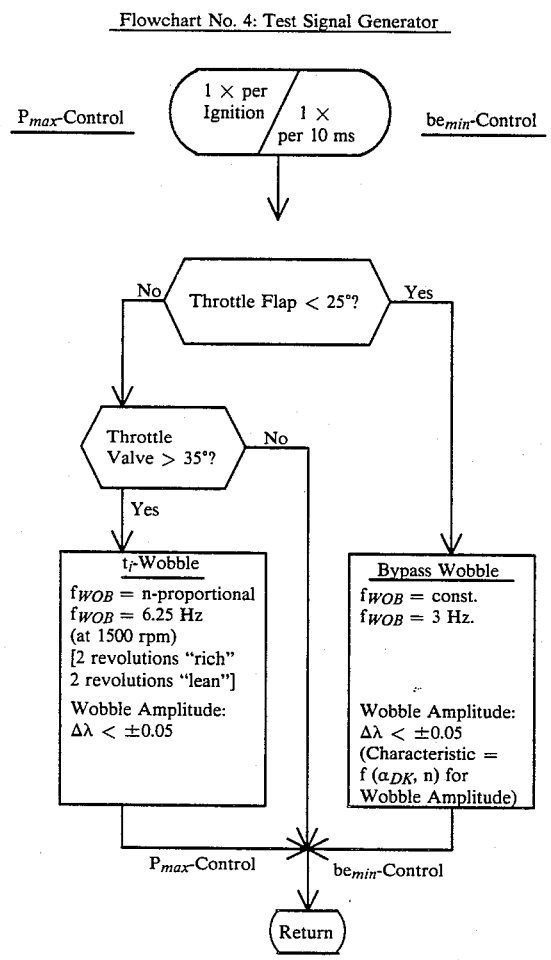

Flowchart No. 4: Test Signal Generator

Flowchart No. 5: Bandpass Filter

-continued

Flowchart No. 5: Bandpass Filter

Sampling Frequency:

$P_{max}$-Control:
8 Samplings per Test Signal Period $be_{min}$-Control:
32 Samplings per Test Signal Period Filter Algorithm:
$BNF = -a_1 \cdot BNF1 - a_2 BNF2 + b_1 \cdot BN1 - b_2 \cdot BN2$
where:
BNF = New Filter Value (16 Bits)
BNF1, BNF2 = Old Filter Values (24 bits)
BN1, BN2 = Old RPM Values (16 Bits)

Store Phase and Amplitude (Positive Peak Value)

Return

Flowchart No. 6: Evaluate by Amount and Phase

1 × per Test Signal Period

Acceleration or Overrun? — Yes → Return

No

Idle? — Yes → $be_{min}$-Control for Idle Mixture

No

-continued

Flowchart No. 6: Evaluate by Amount and Phase

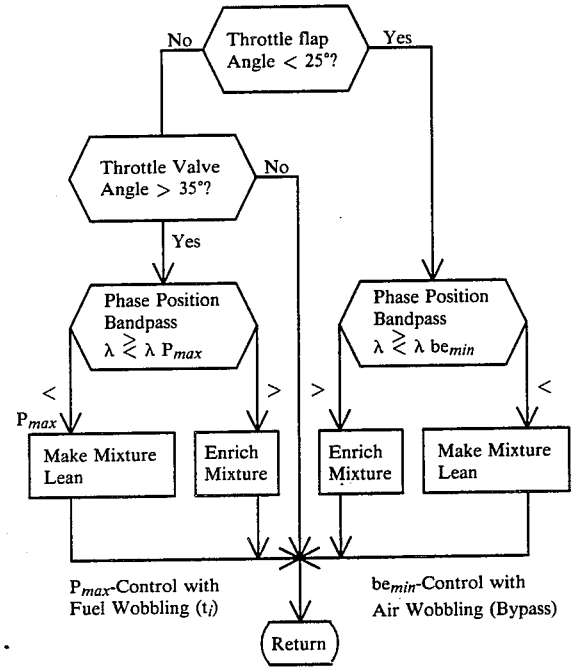

Flowchart No. 7: Compute Duration of Injection

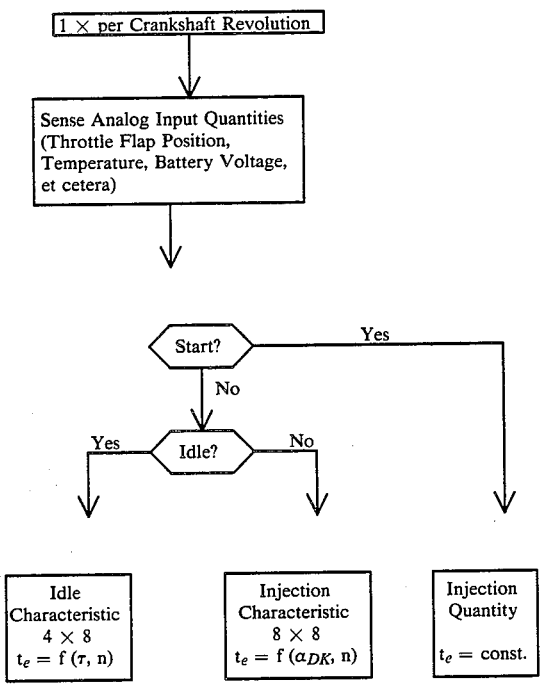

-continued
Flowchart No. 7: Compute Duration of Injection

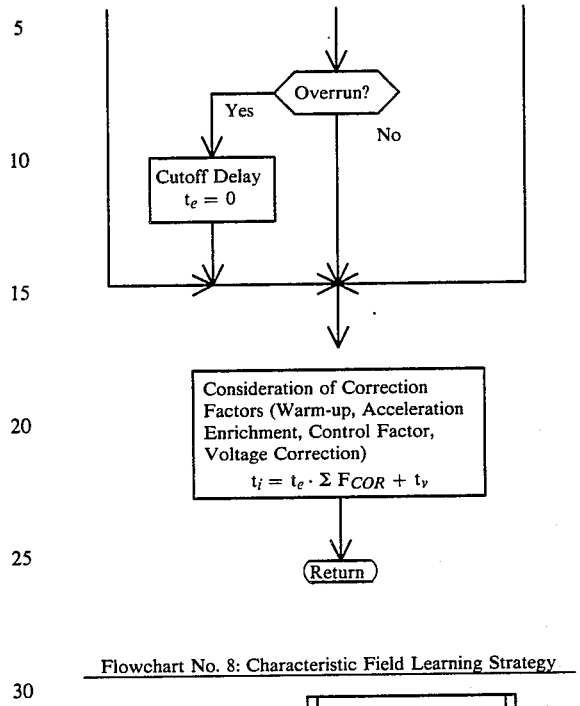

Flowchart No. 8: Characteristic Field Learning Strategy

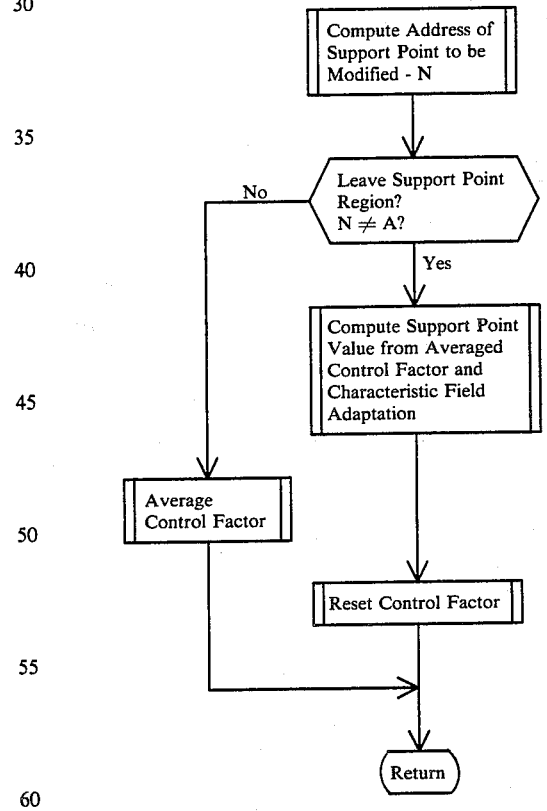

Following these flowcharts illustrating the program flow for an extreme-value control, a few further developments, improvements and simplifications of the control methods so far described will be discussed.

As already described with reference to FIGS. 1 and 2, the extreme-value control method which is aimed at minimum fuel consumption $be_{min}$ requires wobbling of the air via an air bypass, for example, which bypasses the throttle flap. For passage through the relatively long line between the bypass and the individual cylinders, the air mixture requires a certain amount of time. These transit times limit the frequency of air wobbling and consequently result in a relatively slow response of the control. By contrast, the fuel quantity can be wobbled at a relatively high frequency because the injection valves are provided directly at the combustion chamber as a result of which the effects of transit time can be neglected. In the following, various methods are disclosed by means of which a control of fuel consumption to a minimum can be realized by means of fuel wobbling as a test signal. These methods have the added advantage of dispensing with the need for an air bypass.

Figure 14:
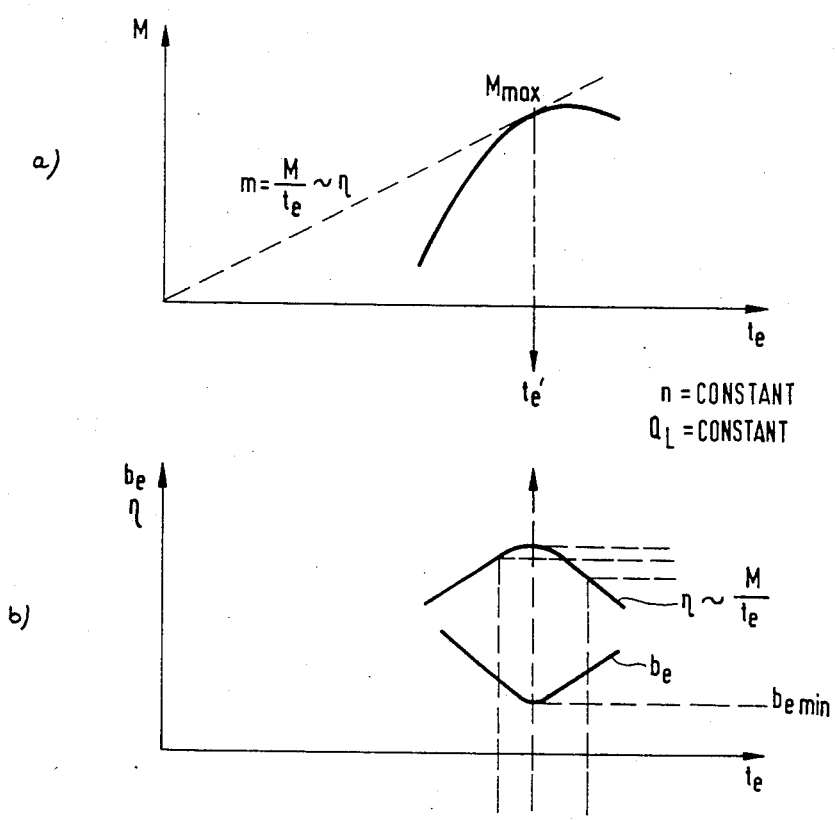
FIG. 14a is a graph showing the torque of an internal combustion engine plotted against the duration of injection, with rotational speed n and air quantity $Q_L$ constant.
FIG. 14b is a graph showing the efficiency or specific fuel consumption plotted against the duration of injection, with rotational speed n and air quantity $Q_L$ constant.

To explain the basic idea, reference is made to FIG. 14. FIG. 14a shows the torque M of an internal combustion engine plotted against the noncorrected duration of injection $t_e$. FIG. 14b shows the efficiency $\eta$ or the specific fuel consumption, likewise plotted against the noncorrected duration of injection $t_e$. The course of the torque at constant air quantity and constant rotational speed as illustrated in FIG. 14a can be derived from the solid lines of FIG. 1; however, instead of the Lambda value of the mixture, the duration of injection serves as the abscissa. Since the quotient of torque M and duration of injection $t_e$ corresponds to the efficiency, the tangent m indicates the maximum efficiency or the minimum specific fuel consumption. FIG. 14b shows the respective curves for efficiency and specific fuel consumption.

A method presenting itself now is to wobble the duration of injection $t_e$ and to have a torque sensor 69, shown in FIG. 13, determine the relevant torque from which the efficiency $\eta \sim M/t_e$ of the engine is then determined. If this value is filtered in a digital bandpass filter, for example, and compared with the test signal, the phase relationship between the test signal and the signal at the output of the bandpass filter (also refer to description of FIGS. 2, 3, 4) permits a determination of whether the basic adaptation is to the right or to the left of the maximum. Suitable correcting interventions can then be made by a control unit. Since wobbling of the duration of injection at maximum efficiency results in torque changes, the magnitude of the wobble has to be kept small in practical driving situations. It is to be noted that the system considers the torque measurement as an absolute measurement. A shift of, for example, the zero point caused by offset voltages results immediately in a shift of the computed maximum. It is an advantage of this control method that it requires no air bypass for wobbling the inducted air. It is to be understood that the principle of wobbling the duration of injection is also suitable for use in other mixture metering systems which do not necessarily derive their input quantities from rotational speed and throttle flap position.

In the following, another method for controlling to minimum fuel consumption will be described. In this method, the fuel quantity is wobbled as a test signal, however, without the need for a torque sensor. The equation that follows will show that the torque can also be determined from the rotational speed change:

$$M - W = \Delta M = -2\pi \cdot \theta \frac{\Delta T}{T^3}$$

wherein:

M = Torque
W = Load Moment
$\Delta M$ = Mean Value of Torque Change Over One Revolution
$\theta$ = Inertia Moment
T = Period of One Revolution
$\Delta T$ = Period Change By dividing $\Delta M$ by $\Delta t_e$, the slope of the torque curve of FIG. 14a can be determined. If, on the other side, the slope for point $be_{min}$ had been measured at the individual operating points of the internal combustion engine and stored, for example, as a desired value in a memory, a control system can be obtained by comparing the actual and the desired values. In this method, however, it is also possible to predetermine other desired values and thus to regulate to operating points which do not correspond to $be_{min}$.

As becomes apparent from the equation, the inertial moment $\theta$ is considered in the computation of the slope. It varies, however, in dependence on the gear engaged and on the load condition of the internal combustion engine. In vehicles equipped with torque converters, the influence on the computed slope is generally very small. In vehicles with manual transmissions, however, this influence is not always negligible. A solution presenting itself here is, for example, to predetermine the desired values in dependence on gear or load. A simple possibility is to determine the injection characteristic only in one gear, for example, the highest gear, and to assume the characteristic as given for all other gears. Although the equation is valid only on condition that the load moment W is constant, the error resulting from minor load-moment changes can be neglected under normal operating conditions of the internal combustion engine.

The arrangement described in the following results in a simplification and an improvement of the above-described injection methods with characteristic anticipatory control and a superposed control. In this arrangement, different control methods are applied in dependence on the operating region of the internal combustion engine. As already described with reference to FIG. 12, the characteristic is subdivided into a number of ranges for idling, overrunning, part load and full load in dependence on input quantities such as throttle flap position $\alpha$ and rotational speed n. This arrangement is likewise based on the objective to avoid wobbling of the air quantity for $be_{min}$-control in the part-load range. To this end, the characteristic values of the anticipatory control are adapted in the full-load range such that the engine operates at maximum efficiency. The air ratio is then in the neighborhood of $\lambda \leq 1$ as is also the case for the idle range. In the part-load range, the characteristic values are adapted to the minimum fuel consumption $be_{min}$. Here, the air ratio $\lambda$ varies between $1.1 \leq \lambda \leq 1.5$. In overrunning, the fuel quantity is reduced to very low values or to zero. Considering that the throttle flap position is no direct measure of the air quantity, changes in air pressure and air temperature affect directly the Lambda value of the mixture supplied to the internal combustion engine. Therefore, the anticipatory control values for the fuel quantity supplied to the internal combustion engine which are stored in the characteristic have to be corrected by a superposed control so that the Lambda value can be suitably adjusted.

A particularly simple control method is a control which is aimed at maximum power and, apart from the idle range, acts only in the full-load range. The control unit generates a factor by which the changes in the inducted air quantity which are caused by pressure or temperature variations are taken into account. It is to be understood that this factor, which is only determined in the full-load range, also applies by approximation to the characteristic values of the part-load range. For this reason, it is convenient to store this factor at the time a transition to the part-load range occurs and to have it also operate on this range. Overall, this control factor influences the whole part-load and full-load range; however, it is only determined under full-load conditions of the internal combustion engine.

Figure 15:
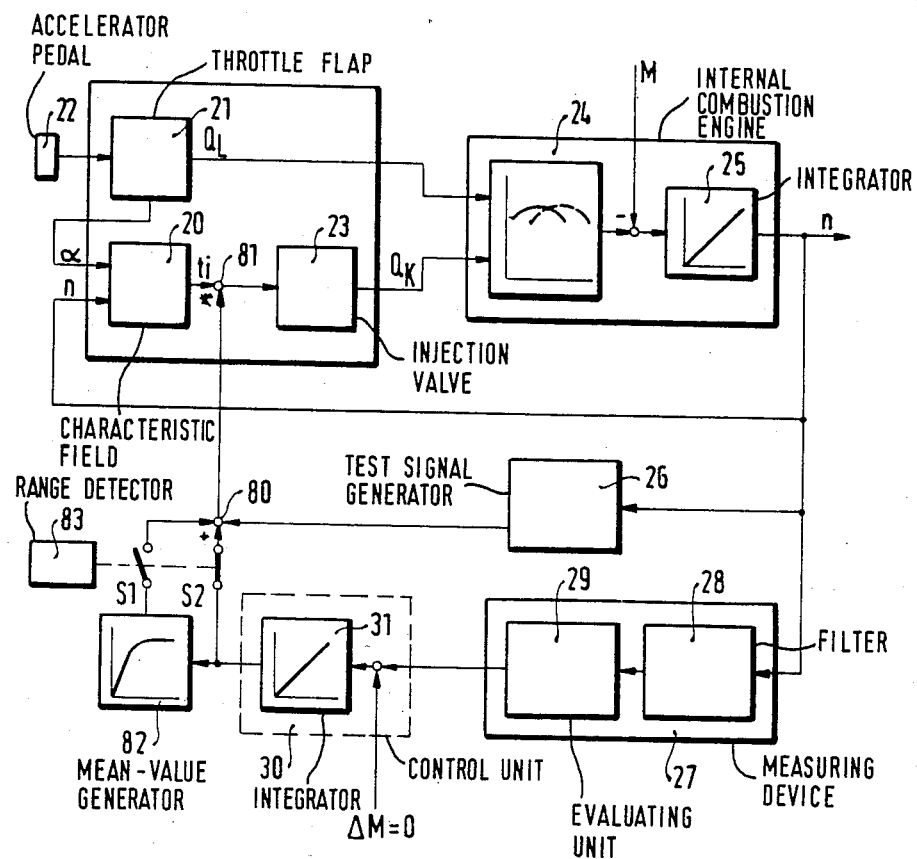
FIG. 15 is a block diagram of a fourth embodiment.

FIG. 15 shows a block diagram of the control circuit. Parts identical to those of FIGS. 2 and 5 have been assigned identical reference numerals. Only the differences from previous embodiments or new features will be described in the following. Since this embodiment relates to a control for maximum power, the test signal generator 26 acts via a summing point 80 and a multiplication point 81 solely on the durations of injection $t_i$ read out from characteristic 20. Since two injection pulses are alternately enriched and leaned out at a time, a speed-dependent influence results. Under full-load conditions, the control unit 30, which receives the output signals of measuring device 27, operates via switch S2 multiplicatively on the value read out of the characteristic. Control unit 30 operates with a minimum possible time constant, while at the same time an average is formed by a mean-value generator 82. When the full-load range is left, control unit 30 is shutoff, switch S2 is opened and switch S1 closed. Thus, the control factor stored by mean-value generator 82 comes into effect in the part-load range in a manner influencing the durations of injection $t_i$ read out of characteristic 20 in a multiplicative fashion. Also at idling, the control is aimed at maximum power so that in this range, too, control unit 30 can be used in combination with switch S2. If the switchover and shutoff operations of the control unit can be performed by suitable software tools, a substantially symbolic significance is imported to range detector 83.

This arrangement provides a simple means for adapting the characteristic values of the duration of injection $t_i$ for the part-load range to the changing operating conditions of the internal combustion engine by means of a full-load control. The methods described with reference to this arrangement are particularly simple and can be implemented with little effort and at low cost purely by software means.

Situations may occur in which this new calibration after full-load operation can be performed only relatively rarely. An example of such a situation is when the motor vehicle is operated for several consecutive days in the part-load range only, such as in city traffic. A too infrequent recalibration of the characteristic values can under circumstances adversely affect the internal combustion engine in the part-load range. A substantially more frequent new determination of the control factor is accomplished if it is also possible to calibrate in the part-load range.

Figure 16:
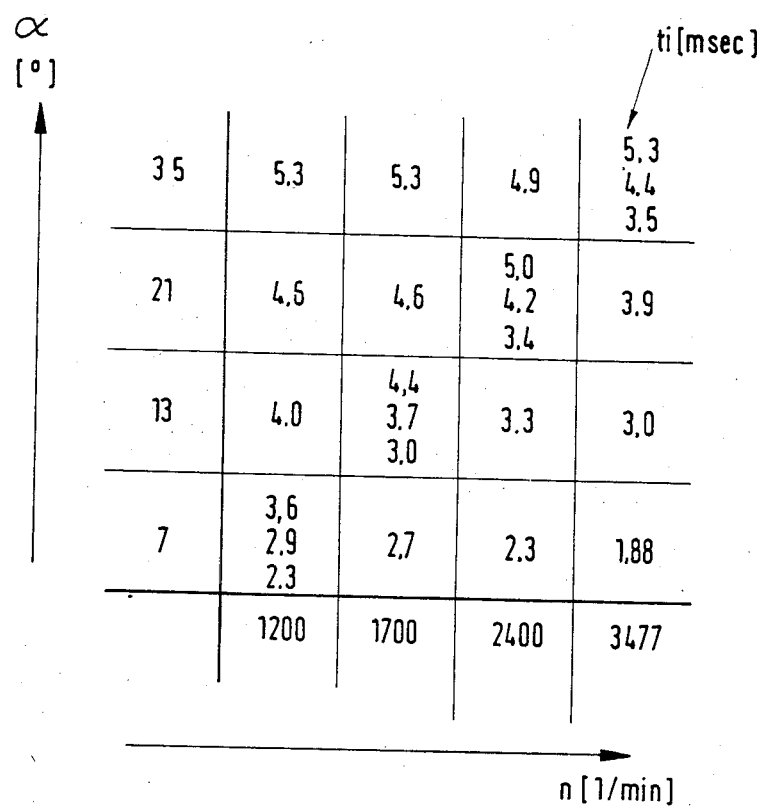
FIG. 16 is a chart showing a portion of the $\alpha$-n characteristic.

To explain this method, FIG. 16 shows a portion of the characteristic of FIG. 12. In FIG. 16, four characteristic values which are accessed particularly frequently in the part-load range were selected for recalibration. The middle value ($t_i=2.9$ ms at n=1200 and $\alpha=7°$) applies in the normal part-load range. The upper value ($t_i=3.5$ ms) corresponds to the duration of injection for this particular operating point of the internal combustion engine if the values were regulated to maximum power. This value was previously determined by experiment. If during the operation of the vehicle one of these four part-load points drawn in FIG. 16 by way of example is accessed and if, in addition, the system is to be recalibrated, the injected quantity of fuel will change, for example, from $t_i=2.9$ ms to $t_i=3.5$ ms for the duration of calibration. Via the control for maximum power it is established whether this preselected fuel quantity corresponds to the power maximum in this particular operating range of the internal combustion engine. If a deviation is established which is attributable to changed air temperatures or air pressures compared to normal, a factor is determined taking these changes into account. In accordance with the method previously described, this factor is applied to the characteristic values $t_i$ for the part-load range.

Since the operator of a vehicle equipped with such an internal combustion engine is likely to become confused by the increased engine output occurring during the calibration process, this output should remain unaffected by the calibration.

To this end, one method is to intervene in the ignition system, to the effect that the increase in engine power necessarily brought about by the control for maximum power is compensated for by retarding the ignition point. Once the control factor is determined, the normal ignition point together with the characteristic values of $be_{min}$ can be used again, applying a new control factor.

Another possibility is to modify the increase in engine output occurring during calibration by determining the control factor only for some of the cylinders of the internal combustion engine. The prerequisite for this is, however, that the injection valves be separately selectable. In this method, one portion of the cylinders is switched over to a control for maximum power as described; whereas, for the remaining cylinders, the duration of injection is reduced by such an amount that the average total power remains constant.

In the example shown ($\alpha=7°$, n=1200), one half of the cylinders is assigned $t_i=3.6$ ms as the duration of injection, the other half $t_i=2.3$ ms. The control factor determined is thus applicable to all cylinders. However, it may also prove suitable to repeat the method with the remaining cylinders and then utilize a control factor averaged over all cylinders.

Figure 17:
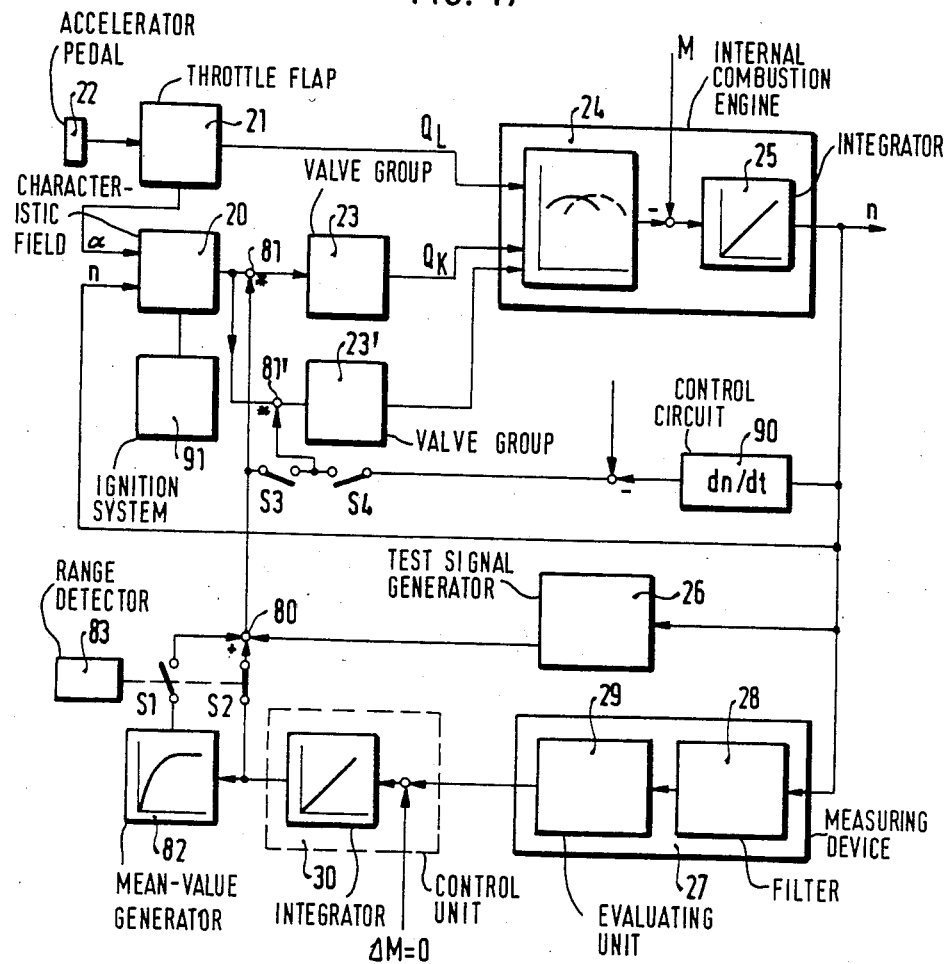
FIG. 17 is a block diagram of a fifth embodiment.

FIG. 17 shows an embodiment for this control method. Blocks identical to those of FIG. 15 have been assigned identical reference numerals and will not be explained here in more detail. In the embodiment of FIG. 17, the injection valves are divided into two groups 23 and 23'. Accordingly, two multiplication points 81 and 81' provided for the characteristic values applied to the two valve groups 23 and 23', respectively.

As already described, either control unit 30 or mean-value generator 82 operates on multiplication points 81 and 81' via summing point 80. During calibration, valve group 23, for example, is selected to receive the increased characteristic values for full-load, and valve group 23' receives the reduced characteristic values to maintain an overall constant power. Should minor power variations nonetheless occur in the form of rotational speed changes, a control circuit 90 responsive to rotational speed changes can be provided for regulating these speed changes out. For this purpose, a switch S4 is closed, enabling the control circuit 90 to act up in valve group 23' via switch S4 and multiplication point 81'. On termination of calibration, switch S4 is opened and switch S3 is closed, which connects summing point 80 to multiplication points 81 and 81'.

The second possibility to maintain the output of the internal combustion engine constant during calibration is indicated by means of an ignition system 91 connected to characteristic 20. In this embodiment, dividing the valves of the internal combustion engine into valve groups is not necessary because the increased engine output resulting from an increase in the duration of injection during the calibration process is compensated for by retarding the ignition point in the ignition system 91. Instead of the reduced value for the duration of injection, a value for the retardation of the ignition point can then be stored in the characteristic.

The arrangement illustrated in FIG. 17 permits frequent recalibration of the control factor for the characteristic values of the duration of injection in the part-load range and accordingly also ensures an improved operating behavior of the internal combustion engine, particularly in the part-load range.

It is to be understood that the invention is not limited to fuel metering systems in which the injection is intermittent, that is, in which the quantity of fuel supplied is governed by the opening period of the injection valves. In an equally advantageous manner, the invention is also applicable to electronically controlled injection systems with continuous fuel injection. Examples of such continuous fuel injection systems are the K-Jetronic and the KE-Jetronic of Robert Bosch GmbH. In these systems, the fuel is injected via a fuel distributor and the corresponding injection valves. The control plunger of the fuel distributor is adjusted by electrohydraulic pressure regulators known per se. The pressure regulator is acted upon by an electronic control unit whose principal control quantities are given by engine speed and load information (air mass, air quantity, intake manifold pressure, throttle flap position). Of particular advantage in such an arrangement is the use of a coarse, yet very simple anticipatory control, for example, a throttle-flap-angle/engine-speed anticipatory control, by means of a characteristic, with a superposed control being provided for fine adjustment.

It is to be noted that in a continuous injection, the absolute values of the characteristic quantities necessarily differ from those for intermittent injection because it is either the fuel quantity injected per stroke or the fuel quantity injected per unit of time on which the respective injection is based. Further, the control unit has to fulfill the following functions influencing the metering of the air-fuel mixture: acceleration enrichment, full-load enrichment, part-load lean-out, Lambda control, lean-out to compensate for altitude. With regard to the controls superposed on the anticipatory control, the control methods previously described are suitable; these include, for example, Lambda controls or extreme-value controls directed to controlling for minimum consumption, maximum power or also smooth running conditions.

Further, the invention is also applicable to internal combustion engines having auto-ignition. In that event, the rotational speed and the accelerator pedal position, for example, may be used as characteristic input quantities, the accelerator pedal position being used in lieu of the throttle flap position. Those skilled in the art of fuel metering for internal combustion engines should have no difficulty in applying the embodiments described herein to internal combustion engines having auto-ignition.

In the foregoing, the invention was explained and described with reference to embodiments for the metering of fuel. However, the invention is not to be construed as being limited to these embodiments but is advantageously suitable for use also with other control methods utilized in internal combustion engines. The following systems for controlling operating characteristic quantities of internal combustion engines shall be mentioned by way of example: air-fuel metering, determination of ignition point, monitoring charge-air pressure, particularly in turbochargers, exhaust-gas recirculation rate or idle-speed monitoring. Applying the invention to the systems listed poses no difficulty to those skilled in the art since the essence of the invention is clearly disclosed by means of the embodiments described herein.

It is understood that the foregoing description is that of the preferred embodiments of the invention and that various changes and modifications may be made thereto without departing from the spirit and scope of the invention as defined in the appended claims.

What is claimed is:

1. Apparatus for controlling operating characteristic quantities of an internal combustion engine, the apparatus comprising:

characteristic field means for pre-controlling engine variables influencing the operating characteristic quantities, said field means being made up of the operating characteristic quantities of the engine;

an optimizer for controlling the engine to maximum power output, said optimizer being superposed on the pre-control of said characteristic field means and including: control means for determining corrective values in a predetermined operating range of the internal combustion engine; and, means for applying said corrective values to influence all pre-control values of said characteristic field means over all operating ranges of the engine; and, test signal generator means for generating test signals superposed on one of the operating characteristic quantity signals, said test signals being superposed on the fuel metering signal.

2. Apparatus for controlling operating characteristic quantities of an internal combustion engine, the apparatus comprising:

characteristic field means for pre-controlling engine variables influencing the operating characteristic quantities, said field means being made up of the operating characteristic quantities of the engine;

an optimizer for controlling the engine to maximum power output, said optimizer being superposed on the pre-control of said characteristic field means and including: control means for determining corrective values in a predetermined operating range of the internal combustion engine; and, means for applying said corrective values to influence all pre-control values of said characteristic field means over all operating ranges of the engine; and, multiplication means to which the corrective value signal is applied for influencing said characteristic field values multiplicatively.

3. Apparatus for controlling operating characteristic quantities of an internal combustion engine, the apparatus comprising:

characteristic field means for pre-controlling engine variables influencing the operating characteristic quantities, said field means being made up of the operating characteristic quantities of the engine, an optimizer for controlling the engine to maximum power output, said optimizer being superposed on the pre-control of said characteristic field means and including: control means for determining corrective values in a predetermined operating range of the internal combustion engine; and, means for applying said corrective values to influence all pre-control values of said characteristic field means over all operating ranges of the engine; and, means for determining the corrective value from a comparison of the actual value averaged from the optimizer with the pre-control value stored in said characteristic field means.

4. Apparatus for controlling operating characteristic quantities of an internal combustion engine, the apparatus comprising:

characteristic field means for pre-controlling engine variables influencing the operating characteristic quantities, said field means being made up of the operating characteristic quantities of the engine;

an optimizer for controlling the engine to maximum power output in the part-load range, said optimizer being superposed on the pre-control of said characteristic field means and including: control means for determining corrective values in a predetermined operating range of the internal combustion engine; and, means for applying said corrective values to influence all pre-control values of said characteristic field means over all operating ranges of the engine; and, test signal generator means for generating test signals superposed on one of the operating characteristic quantity signals.

5. Apparatus for controlling operating characteristic quantities of an internal combustion engine, the apparatus comprising:

characteristic field means for pre-controlling engine variables influencing the operating characteristic quantities, said field means being made up of the operating characteristic quantities of the engine;

an optimizer for controlling the engine to maximum power output in the part-load range, said optimizer being superposed on the pre-control of said characteristic field means and including: control means for determining corrective values in a predetermined operating range of the internal combustion engine; and, means for applying said corrective values to influence all pre-control values of said characteristic field means over all operating ranges of the engine; and, operating characteristic quantity signals such as fuel metering signals being stored in the pre-control characteristic field for a minimal specific fuel consumption as well as for maximum power for selected regions in the part-load range.

6. Method for controlling operating characteristic quantities of an internal combustion engine with an apparatus including characteristic field means made up of operating characteristic quantities of the engine, the characteristic field means pre-controlling engine variables influencing the operating characteristic quantities, and a control arrangement for controlling to maximum power of the engine and the control arrangement being superposed on the pre-control, the method comprising the steps of:

determining the corrective values from the control loop in a predetermined operating range of the engine;

applying said corrective values to influence all pre-control values of said characteristic field means over all operating ranges of the engine; and, superposing test signals on one of the operating characteristic quantity signals.

7. The apparatus of claim 1, said test signals being superposed on the ignition time point signal.

8. The apparatus of claim 1, wherein a superposed control to maximum power output of the internal combustion engine is carried out in the upper load range of the engine.

9. The apparatus of claim 8, said applying means including storage means for holding the corrective value for the pre-control characteristic field determined by the optimizer in the upper load range and applying said corrective value so as to make the same effective for all load ranges of the engine.

10. The apparatus of claim 5, wherein the corrective values for said pre-control characteristic field are determined from a comparison of the actual value determined from the optimizer with the desired value stored in the characteristic field.

11. The apparatus of claim 10, wherein the optimizer is activated to maximum power for a short time in time intervals that are dependent upon operating parameters.

12. The apparatus of claim 11, wherein the point of time of ignition is retarded during the time interval of the activation of the optimizer to maximum power in the part-load range.

13. The apparatus of claim 11, wherein the optimizer to maximum power is conducted in a cylinder-dependent manner in the part-load range.

14. The apparatus of claim 12, wherein the fuel metered to an individual cylinder is reduced over the time interval of the activation of the optimizer, said individual cylinder not being subjected to the optimizer in the part-load range.

15. The apparatus of claim 14, wherein the specific-cylinder corrective factors are averaged.

16. The apparatus of claim 1, comprising a control loop for acting on the ignition or the specific-cylinder fuel metering, the control loop holding the rotational speed of the engine constant during the time interval that the optimizer is activated to maximum power.

17. The method of claim 6, said test signals being superposed on the fuel metering signal.

* * * * *

UNITED STATES PATENT AND TRADEMARK OFFICE
CERTIFICATE OF CORRECTION

PATENT NO. : 4,646,697

DATED : March 3, 1987

INVENTOR(S) : Ferdinand Grob et al.

It is certified that error appears in the above-identified patent and that said Letters Patent is hereby corrected as shown below:

The sheets of drawing consisting of FIGS. 18, 19, 20, 21, 22, 23, 24 and 25 should be added as shown on the attached sheets.

On the Title Page, "17 Claims, 20 Drawing Figures" should read -- 17 Claims, 32 Drawing Figures --.

Figure 18:
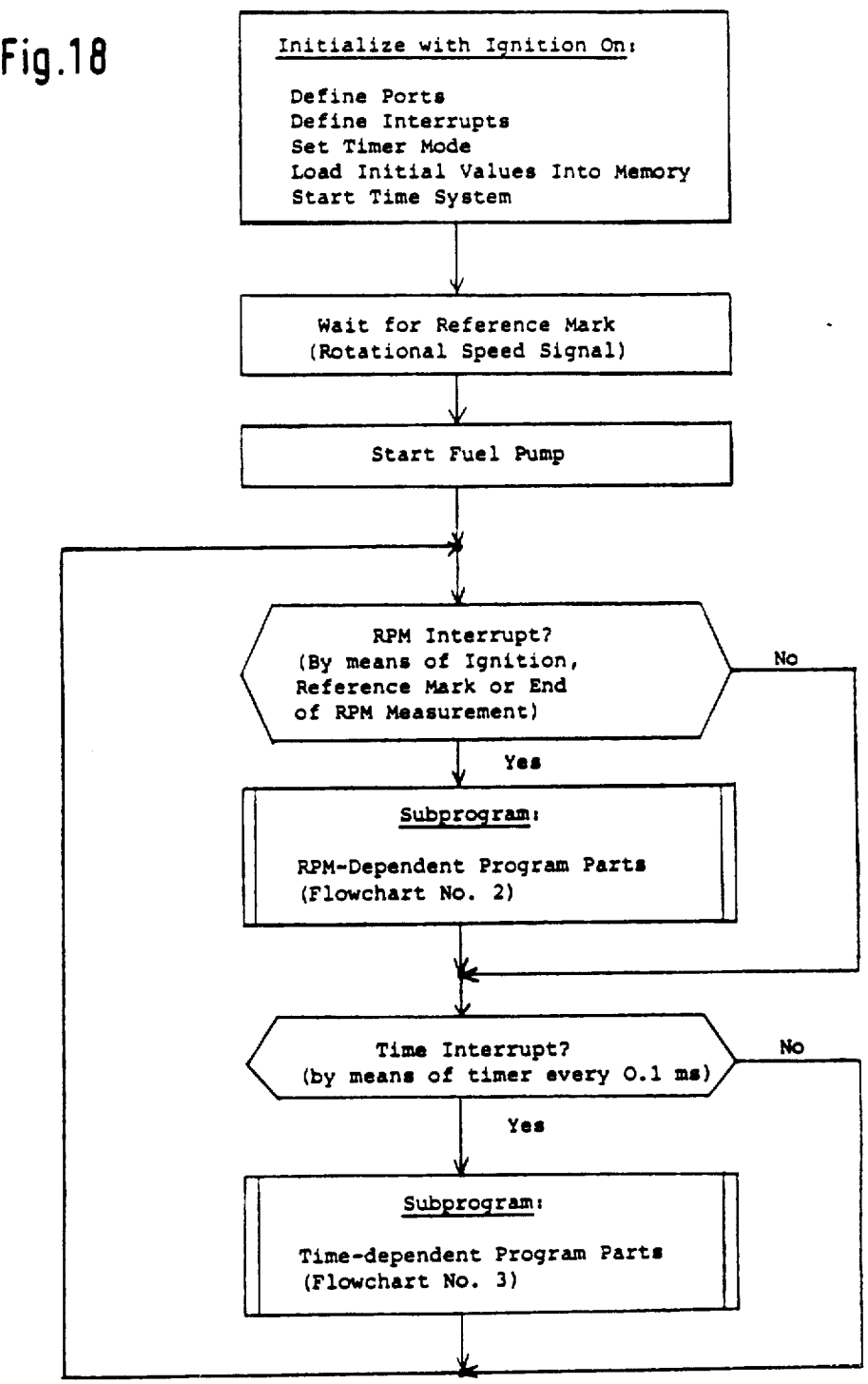
Figure 19:
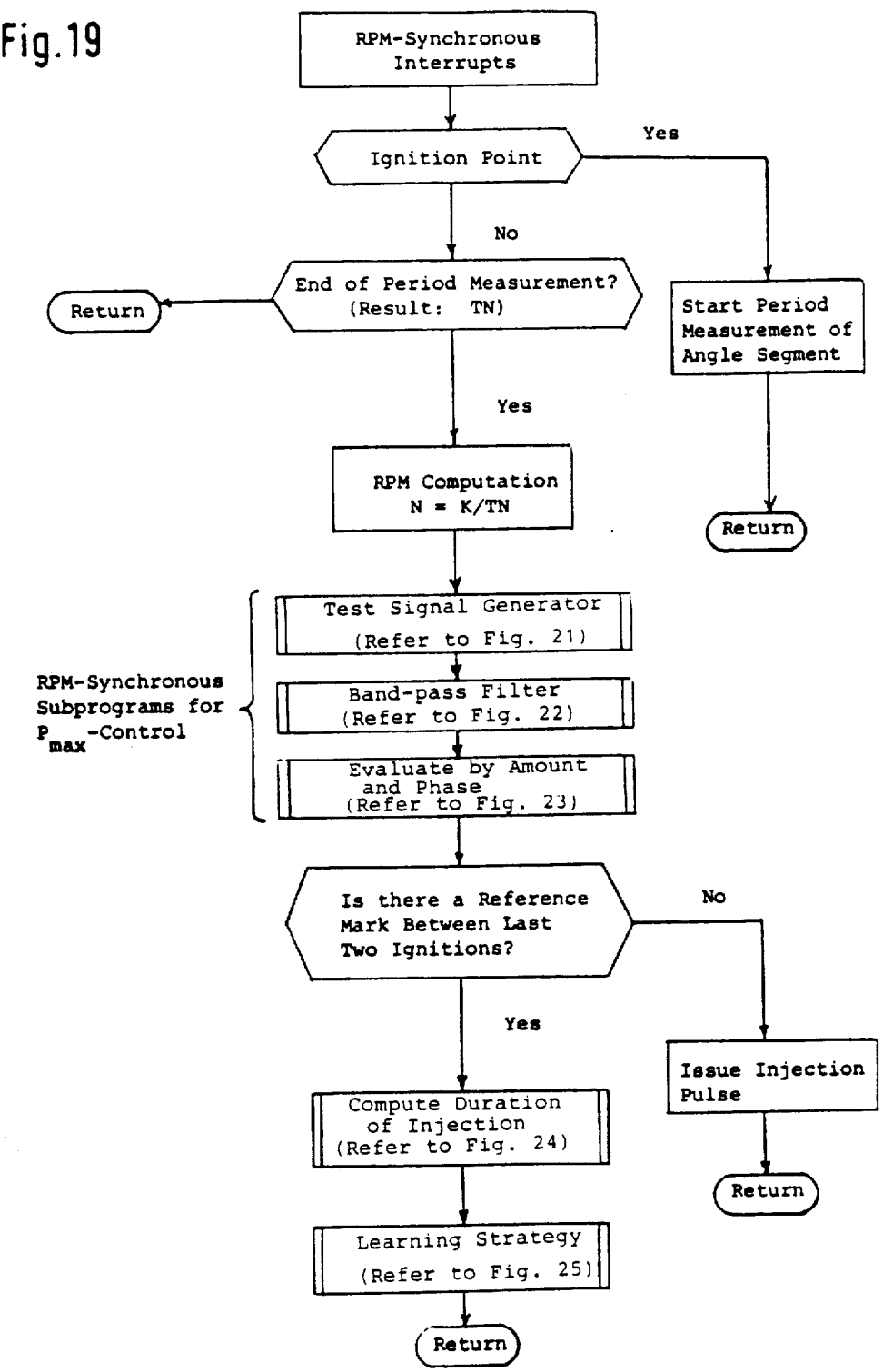
Figure 20:
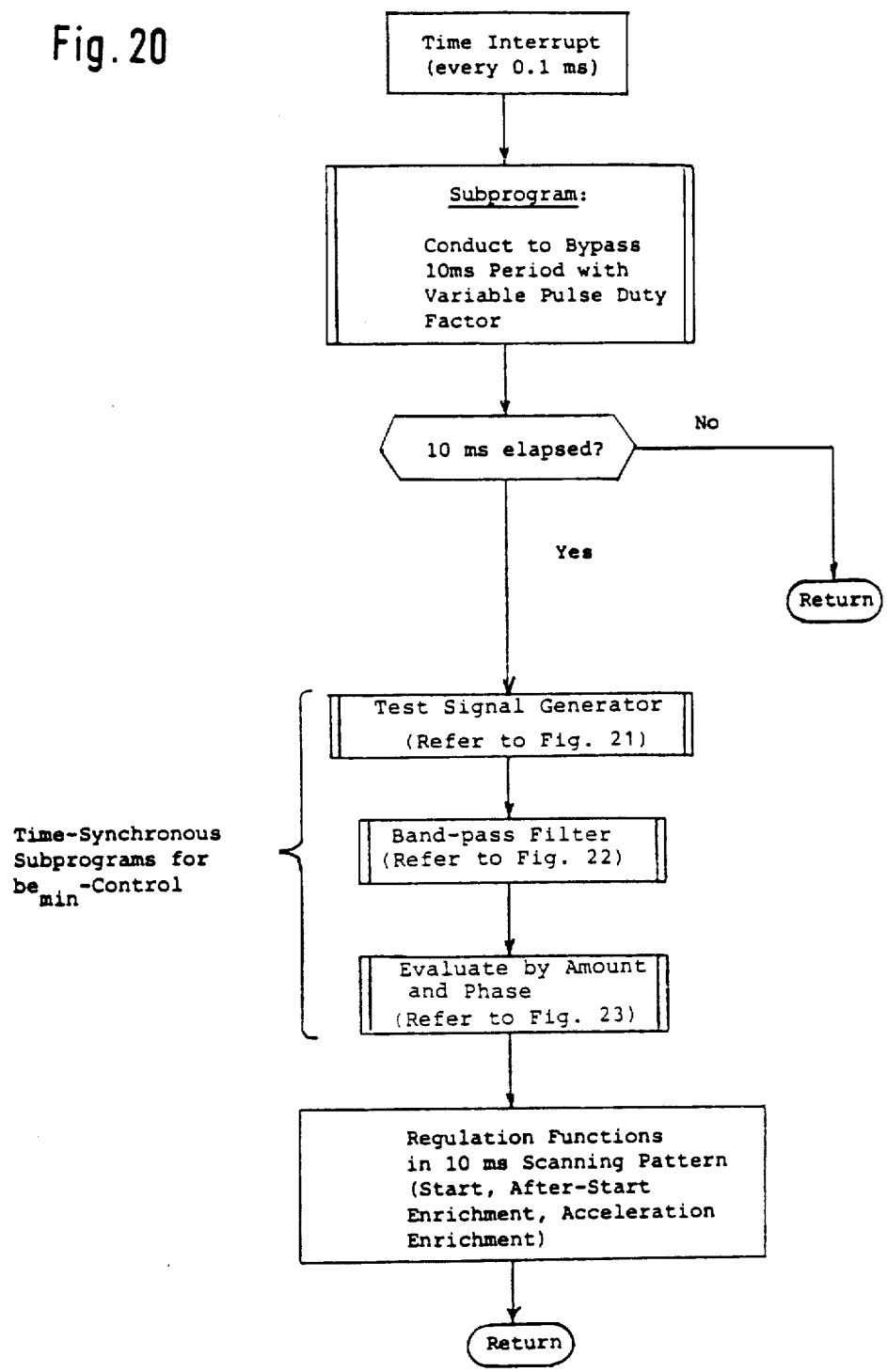
Figure 21:
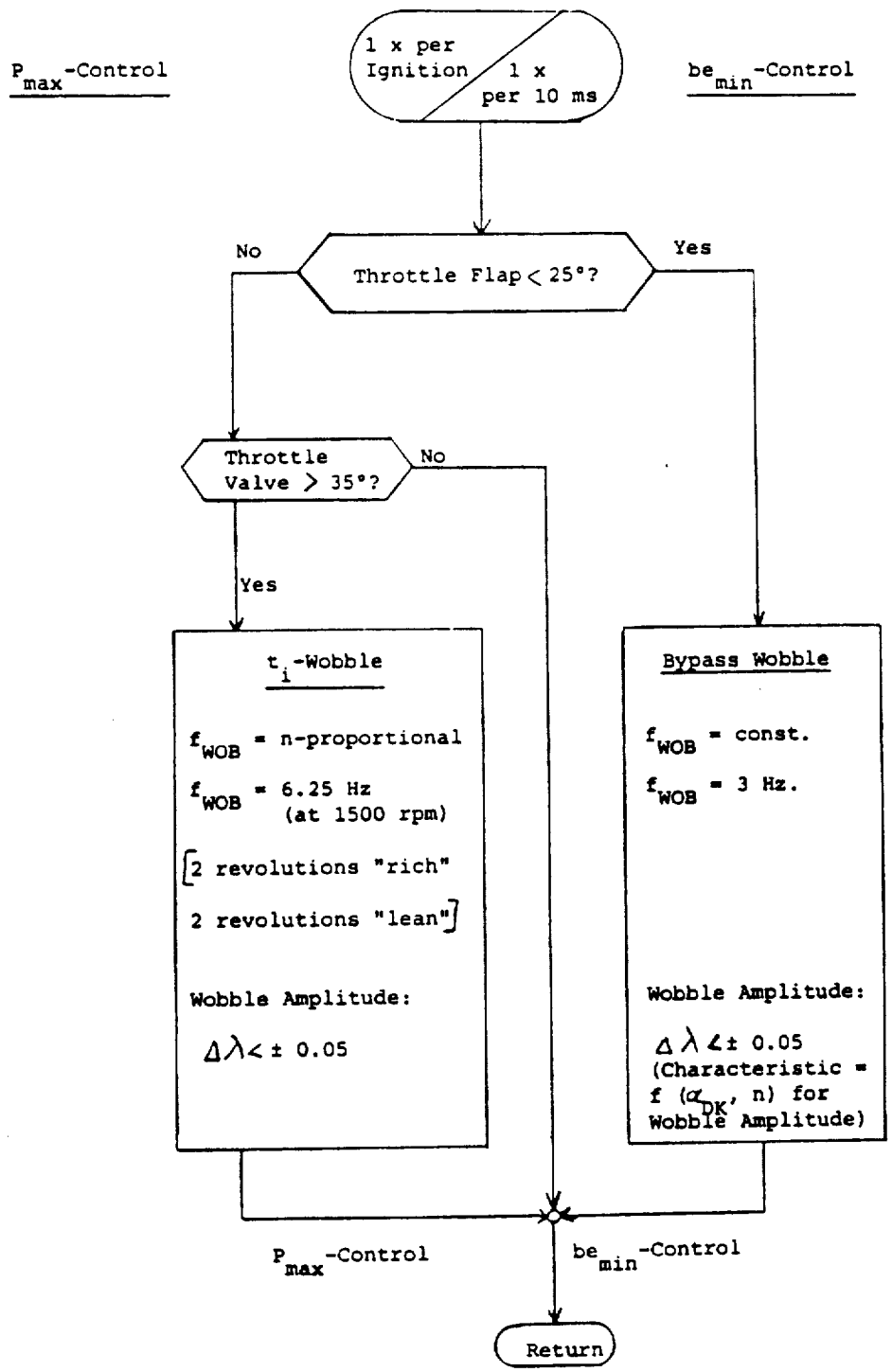
Figure 22:
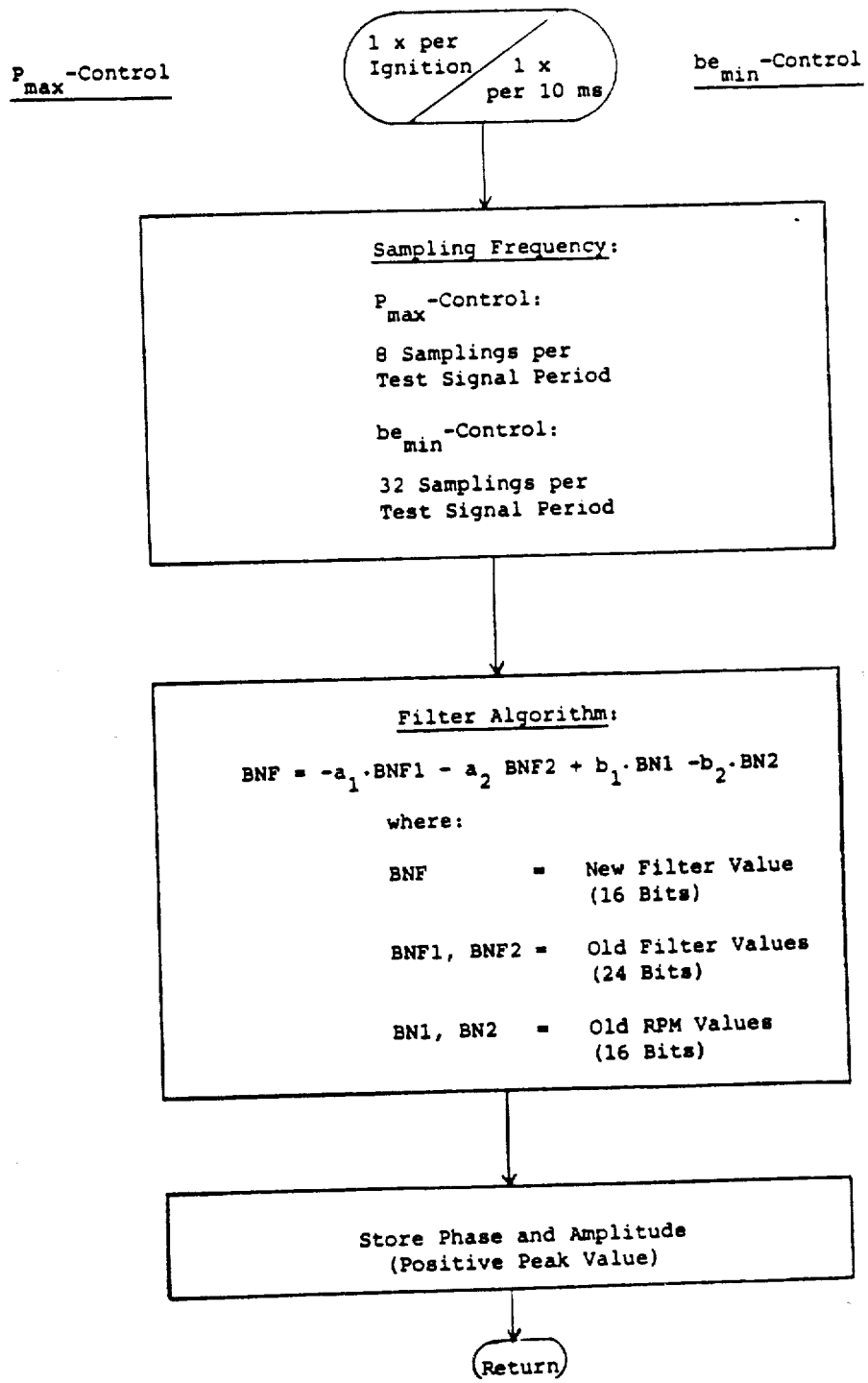
Figure 23:
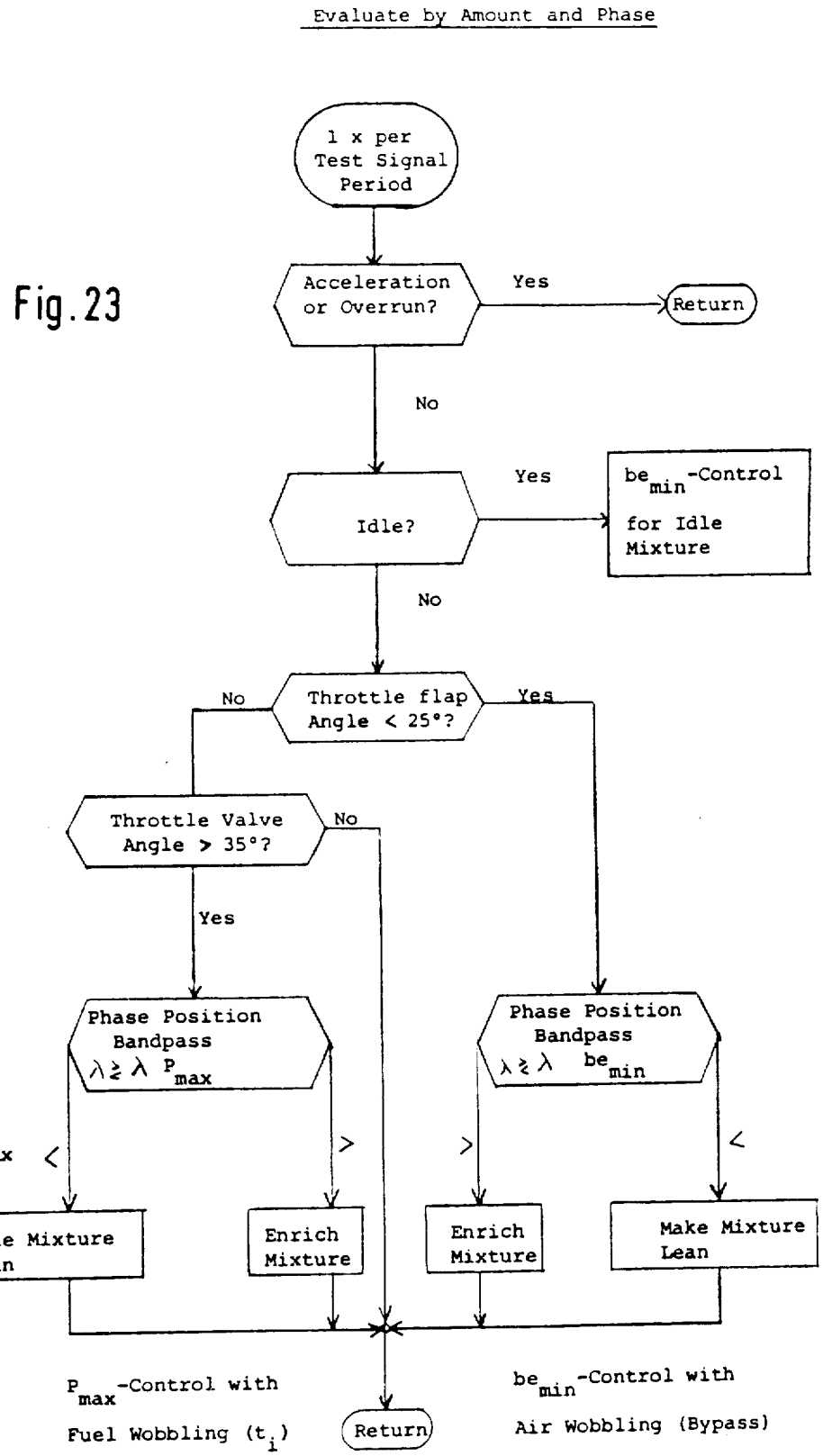
Figure 24:
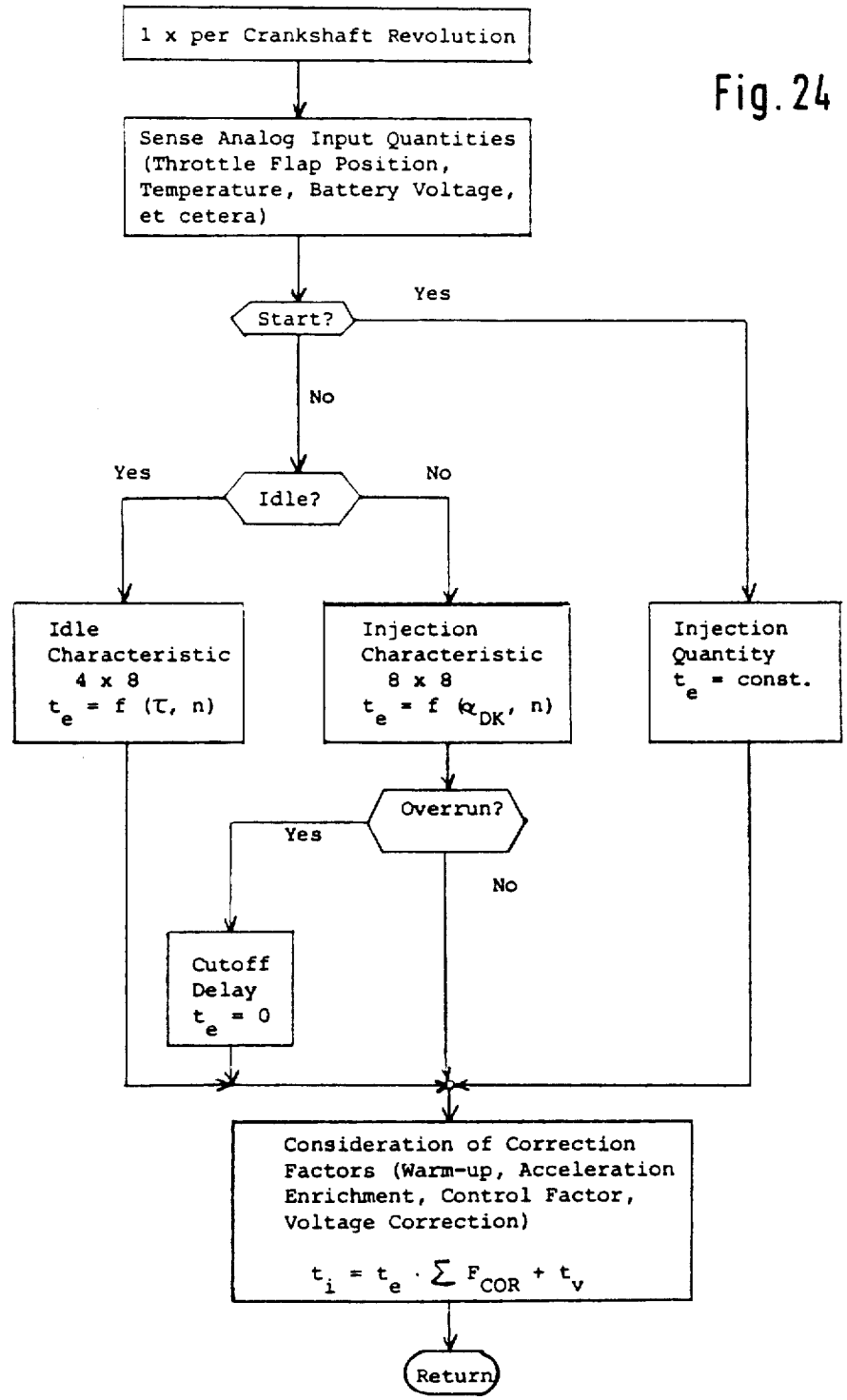
Figure 25:
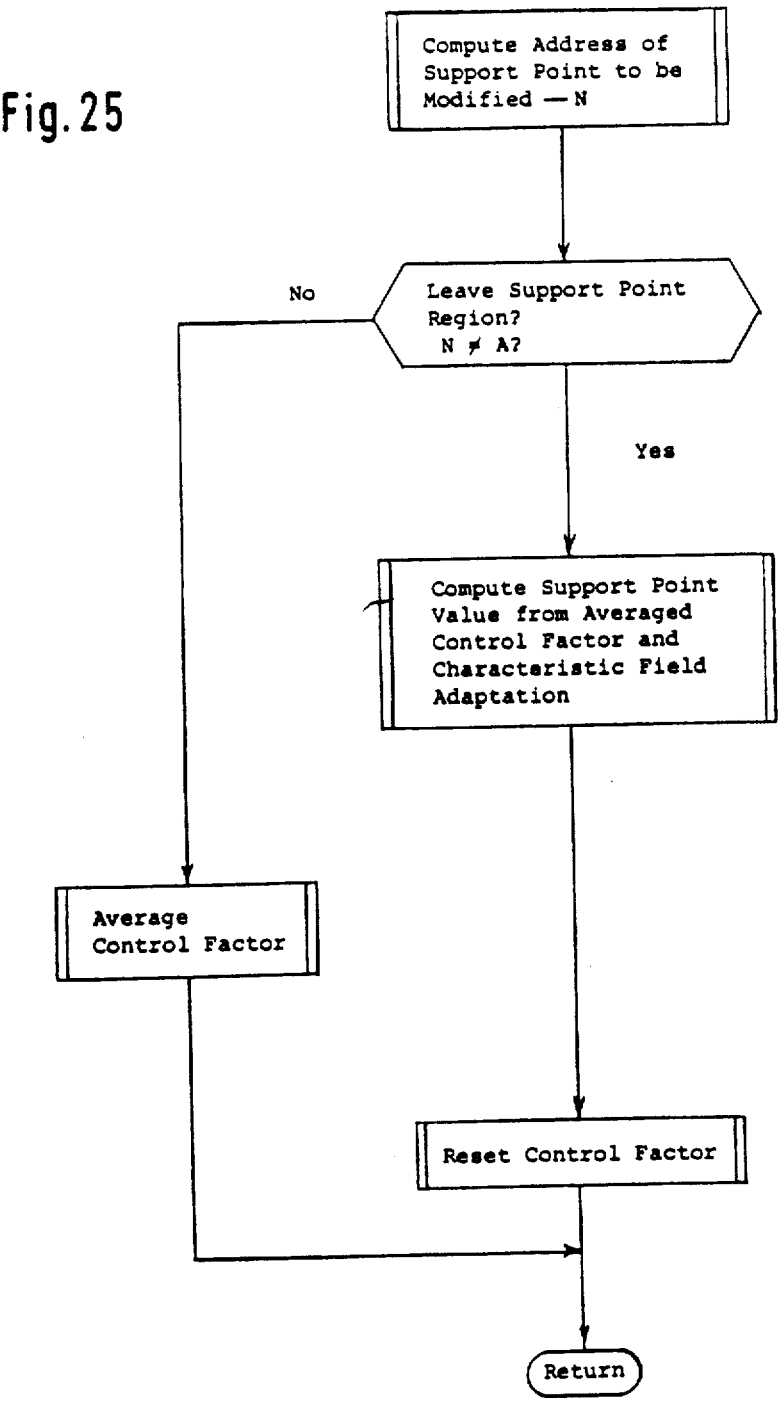

Column 3, after line 6, insert the following:

-- FIGS. 18 to 25 are a series of flow charts for explaining the program flow for an extreme-value control as shown in FIG. 2, wherein:

FIG. 18 is the flow chart of the main program;

FIG. 19 is the flow chart of the subprogram for rpm-dependent program parts;

FIG. 20 is the flow chart of the subprogram for time-dependent program parts;

FIG. 21 is the flow chart for the test signal generator;

FIG. 22 is the flow chart of the subprogram for the bandpass filter;

FIG. 23 is the flow chart of the subprogram for evaluation by amount and phase;

FIG. 24 is the flow chart for computing the duration of injection; and,

FIG. 25 is the flow chart of the characteristic field learning strategy. --.

UNITED STATES PATENT AND TRADEMARK OFFICE
CERTIFICATE OF CORRECTION

PATENT NO. : 4,646,697

DATED : March 3, 1987

INVENTOR(S) : Ferdinand Grob et al.

It is certified that error appears in the above-identified patent and that said Letters Patent is hereby corrected as shown below:

Column 13, line 27, "-control," should read -- ($be_{min}$-control, --.

Columns 14 - 20, delete "Flowchart No. 1 - Flowchart No. 8.

Signed and Sealed this

First Day of November, 1988

Attest:

DONALD J. QUIGG

Attesting Officer    Commissioner of Patents and Trademarks

Fig. 19 — Subprogram for RPM-Dependent Program Parts

Test Signal Generator

Characteristic Field Learning Strategy